US012531223B2

(12) United States Patent
Le Blanc

(10) Patent No.: US 12,531,223 B2
(45) Date of Patent: Jan. 20, 2026

(54) MASS SPECTROMETRY METHODS AND SYSTEMS FOR HIGH PRESSURE CHARGE STATE CONTROL AND/OR FRAGMENTATION

(71) Applicant: DH Technologies Development Pte. Ltd., Singapore (SG)

(72) Inventor: Yves Le Blanc, Newmarket (CA)

(73) Assignee: DH Technologies Development Pte. Ltd., Singapore (SG)

( * ) Notice: Subject to any disclaimer, the term of this patent is extended or adjusted under 35 U.S.C. 154(b) by 308 days.

(21) Appl. No.: 18/283,109

(22) PCT Filed: Mar. 24, 2022

(86) PCT No.: PCT/IB2022/052719
§ 371 (c)(1),
(2) Date: Sep. 20, 2023

(87) PCT Pub. No.: WO2022/201096
PCT Pub. Date: Sep. 29, 2022

(65) Prior Publication Data

US 2024/0162022 A1 May 16, 2024

Related U.S. Application Data

(60) Provisional application No. 63/165,614, filed on Mar. 24, 2021.

(51) Int. Cl.
*H01J 49/00* (2006.01)
*H01J 49/02* (2006.01)
(Continued)

(52) U.S. Cl.
CPC ........ *H01J 49/0045* (2013.01); *H01J 49/022* (2013.01); *H01J 49/063* (2013.01); *H01J 49/24* (2013.01)

(58) Field of Classification Search
CPC .. H01J 49/022; H01J 49/0045; H01J 49/0031; H01J 49/063; H01J 49/067;
(Continued)

(56) References Cited

U.S. PATENT DOCUMENTS

2019/0221415 A1* 7/2019 Covey .................. H01J 49/067

FOREIGN PATENT DOCUMENTS

WO WO-2020230063 A1 * 11/2020 .......... H01J 49/4215

OTHER PUBLICATIONS

International Search Report and Written Opinion, PCT/IB2022/052719, dated Jul. 13, 2022, 13 pages.
(Continued)

*Primary Examiner* — David E Smith
*Assistant Examiner* — Hsien C Tsai
(74) *Attorney, Agent, or Firm* — Potomac Law Group, PLLC; Brian J. Hairston

(57) ABSTRACT

Systems and methods described herein provide for charge state control of multiply-charged anions in a front end, high pressure ion guide. In some example aspects, a mass spectrometer system is provided comprising a first vacuum chamber (121) maintained at a pressure above about 500 mTorr. At least one ion guide (106) is disposed within the first vacuum chamber, the at least one ion guide comprising a plurality of rods extending along a central longitudinal axis. A controller (193) is configured to adjust an amplitude of an RF voltage signal provided to the plurality of rods so as to alternatively operate the ion guide in a first mode of operation with a lower amplitude of the RF voltage signal so as to reduce the likelihood of charge reduction by electron detachment so as to substantially maintain the isotopic distribution of the ions during transmission of ions through the ion guide, and a second mode of operation with a higher amplitude of the RF voltage signal so as to increase the
(Continued)

likelihood of electron detachment from ions being transmitted therethrough.

20 Claims, 13 Drawing Sheets

(51) Int. Cl.
*H01J 49/06* (2006.01)
*H01J 49/24* (2006.01)

(58) Field of Classification Search
CPC ........ H01J 49/24; H01J 49/42; H01J 49/0054; H01J 49/426; G01N 30/84; G01N 30/7233
See application file for complete search history.

(56) References Cited

OTHER PUBLICATIONS

Kinet C et al: “Electron detachment dissociation (EDD) pathways in oligonucleotides”, International Journal of Mass Spectrometry, Elsevier Science Publishers, Amsterdam, NL, vol. 283, No. 1-3, Jun. 1, 2009 (Jun. 1, 2009), pp. 206-213.
Martschini Martin et al: “Selective laser photodetachment of intense atomic and molecular negative ion beams with the ILIAS RFQ ion beam cooler”, International Journal of Mass Spectrometry, Elsevier Science Publishers, Amsterdam, NL, vol. 415, Dec. 15, 2016 (Dec. 15, 2016), pp. 9-17.
Thomas R. Covey et al: “Atmospheric pressure ion sources”, Mass Spectrometry Reviews., vol. 28, No. 6, Jul. 22, 2009 (Jul. 22, 2009), pp. 870-897.

* cited by examiner

| Z | Mono (%) | Total (%) |
|---|---|---|
| 0 | 11.0 | 7.6 |
| 1 | 81.7 | 84.6 |
| 2 | 7.3 | 8.8 |
| 3 | 0 | 0 |
| 4 | 0 | 0 |
| 5 | 0 | 0 |

| Z | Mono (%) | Total (%) |
|---|---|---|
| 0 | 9.7 | 4.2 |
| 1 | 39.6 | 31.7 |
| 2 | 21.2 | 30.1 |
| 3 | 13.2 | 17.8 |
| 4 | 3.5 | 6.0 |
| 5 | 4.9 | 10.2 |

MASS SPECTROMETRY METHODS AND SYSTEMS FOR HIGH PRESSURE CHARGE STATE CONTROL AND/OR FRAGMENTATION

RELATED APPLICATIONS

This application is a 35 U.S.C. § 371 national stage filing of International Application No. PCT/IB2022/052719, filed on Mar. 24, 2022, which claims priority to U.S. Provisional Application No. 63/165,614 filed on Mar. 24, 2021, the contents of both of which are incorporated herein in their entirety.

FIELD

The present teachings are directed to mass spectrometry, and more particularly, to methods and systems for controlling the charge state and/or fragmentation of ions within a front end, high pressure ion guide prior to transmission into the downstream section of a mass spectrometer.

BACKGROUND

Mass spectrometry is an analytical technique for measuring the mass-to-charge ratios (m/z) of molecules within a sample, with both quantitative and qualitative applications. For example, mass spectrometry can be used to identify unknown compounds in a test substance, determine the isotopic composition of elements in a specific molecule, determine the structure of a particular compound by observing its fragmentation, and/or quantify the amount of a particular compound in a test sample.

Mass spectrometry typically involves converting the sample molecules into ions using an ion source and separating and detecting the ionized molecules based on their m/z using one or more mass analyzers. For most conventional mass spectrometer systems utilizing atmospheric pressure ion sources, ions pass through an inlet orifice to enter an ion guide disposed in a first vacuum chamber where they are collisionally cooled and radially focused along the central axis of the ion guide, and then transported as an ion beam into a subsequent, lower-pressure vacuum chamber in which the mass analyzer(s) are disposed. Depending on the experiment, ions generated by the ion source may be detected intact (generally referred to as MS) or alternatively may be subject to fragmentation as in tandem MS (also referred to as MS/MS or $MS^2$) such that product ions resulting from the fragmentation of selected precursor ions may additionally or alternatively be detected.

In order to assign an accurate mass to the intact ions as in MS and/or select the desired precursor ions as in MS/MS, conventional systems generally attempt to transmit the ions generated by the ion source, without modification, from the ion source to the lower-pressure vacuum chambers in which the mass analyzer(s) performing the m/z-based analysis are disposed.

There remains a need for preventing and/or controlling modifications of ions within the front-end ion guides operating at relatively high pressures.

SUMMARY

Ionization at atmospheric pressure (e.g., by chemical ionization, electrospray) is a highly efficient means of ionizing molecules within a sample. For example, ionization of large molecules such as oligonucleotides via an ion source operating at atmospheric pressure and in negative ion mode often results in multiply-charged anions at various charge states. In various aspects of the present teachings, systems and methods described herein can provide for control of modifications to such ions during their transmission through a high pressure, front end ion guide. As will be appreciated by a person skilled in the art, it is known that a particular species of an analyte of interest may exhibit an isotopic distribution of m/z at each charge state due to the presence of isotopes within the various ionized molecules of that particular species. The applicants have discovered, however, that the unintentional detachment of one or more electrons of a particular analyte species at a higher charge state in a high pressure ion guide may result in aberrations in the quantitation of lower charge state ions of that species. In particular, it is believed that electron detachment from the ions in the front end ion guide reduces the charge of the ion without reducing the ion's effective mass, thereby distorting analysis of the ion species' isotopic distribution. In accordance with various aspects of the present teachings, systems and methods described herein are configured to control and/or prevent electron detachment from multiply-charged species in the front end, high pressure ion guide. Certain aspects of the present teachings provide for the control of the amplitude of the RF signal provided to the rods of the ion guide so as to reduce the likelihood of charge reduction so as to substantially maintain the isotopic distribution of ions generated by the ion source. Further to applicant's discovery of charge reduction in high pressure ion guides and control mechanisms therefor, various aspects of the present teachings additionally or alternatively provide a mode of operation in which the RF signal amplitude provided to the rods of the high pressure ion guide may be operated to more likely result in electron detachment from ions being transmitted therethrough. Whereas conventional systems generally attempt to transmit the ions generated by the ion source to the mass analyzer(s) without modification, applicant's recognition and characterization of the charge reduction process in the high-pressure upstream region enables the known, controlled modification of ions. As discussed herein, such methods and systems may enable the intentional formation of radical anions in the high pressure region (and even fragmentation), which may be utilized to provide further information regarding the ion structure as in MS/MS.

In various aspects, systems in accordance with the present teachings comprise a first vacuum chamber maintained at a pressure above about 500 mTorr, the first vacuum chamber extending between an inlet aperture, configured to receive a plurality of ions generated by an ion source in a high pressure ionization chamber, and an exit aperture configured to transmit at least a portion of the plurality of ions from the first vacuum chamber to a second vacuum chamber maintained at a lower pressure relative to the first vacuum chamber. At least one ion guide is disposed within the first vacuum chamber between the inlet aperture and the exit aperture, the at least one ion guide comprising a plurality of rods extending along a central longitudinal axis from a proximal end disposed adjacent the inlet aperture to a distal end, the plurality of rods being spaced apart from the central longitudinal axis and configured to define an internal volume within which the plurality of ions received through the inlet aperture are entrained by a flow of gas. A power supply coupled to the ion guide can be configured to provide a RF voltage signal to the plurality of rods for radially confining the ions within the internal volume so as to control the charge state and/or the fragmentation of ions as the plurality of ions traverse the ion guide. By way of example, in certain aspects, a controller operatively coupled to the power supply can be configured (e.g., automatically or under the direction of a user) to reduce an amplitude of the RF voltage signal provided to the plurality of rods so as to reduce the likelihood of electron detachment from said plurality of ions during transmission through the ion guide. In such aspects, the control of the RF voltage signal may substantially maintain the isotopic distribution of ions generated by the ion source, thereby enabling a more accurate determination of the mass or identity of the ionized molecules (e.g., as in MS) and/or the selection of the ions to be fragmented by one or more downstream mass analyzer(s) (e.g., as in MS/MS).

In certain aspects, the controller can be configured to alternatively or additionally increase an amplitude of the RF voltage signal provided to the plurality of rods so as so as to increase the likelihood of electron detachment from said plurality of ions during transmission through said ion guide. In such aspects, ions from which the electrons have been detached may be subject to fragmentation within the ion guide itself or within a downstream mass analyzer as in MS/MS.

In certain aspects of the present teachings, the controller can be configured to adjust an amplitude of the RF voltage signal provided to the plurality of rods so as to alternatively operate the ion guide in a first mode of operation and a second mode of operation. For example, the RF voltage signal may be adjusted to either substantially maintain the isotopic distribution of the plurality of ions during transmission through said ion guide in the first mode of operation or increase the likelihood of subjecting the ions to electron detachment during transmission through said ion guide in the second mode of operation, wherein the amplitude of the RF voltage signal in the first mode of operation is less than the amplitude of the RF voltage signal in the second mode of operation.

The plurality of ions can be generated from a variety of analytes. By way of non-limiting example, in some aspects, the plurality of ions may comprise oligonucleotides. In certain aspects, the ion source may be operating in negative ion mode and the plurality of ions may be anions.

As noted above, the amplitude of the RF voltage signal may be lower in the first mode of operation relative to that of the second mode of operation. By way of non-limiting example, for the same expected m/z range of ions generated by the ion source, the RF voltage signal in the first mode of operation may be less than or equal to about 200 $V_{p-p}$ and the RF voltage signal in the second mode of operation may be greater than or equal to about 250 $V_{p-p}$. In certain aspects, a maximum of the RF voltage signal in the first mode of operation may be 210 $V_{p-p}$ and/or a maximum of the RF voltage signal in the second mode of operation may be about 300 $V_{p-p}$. For example, though the selected amplitude of the RF voltage signal applied to the rods of the ion guide in each mode of operation can be dependent on the m/z of the ions transmitted from the ion guide (e.g., a higher expected m/z range of the analytes of interest may necessitate higher amplitudes in both modes of operation) in accordance with the present teachings, the amplitude of the RF signal may be lower in the first mode of operation (e.g., maximum of 210 $V_{p-p}$) relative to the second mode of operation (e.g., maximum of 300 $V_{p-p}$) for the same m/z range for ions transmitted into the ion guide.

Mass analyzers used to analyze the plurality of ions can have a variety of configurations and can be configured to operate in a variety of manners in accordance with various aspects of the present teachings. By way of example, in certain aspects, the plurality of ions may be transmitted from said ion guide to one or more downstream mass analyzers and a detector may be configured to detect a m/z of at least a portion of said plurality of ions. In certain aspects, the m/z of said at least a portion of said plurality of ions may be detected as generated by the ion source as in MS, for example, without substantially fragmenting said plurality of ions transmitted from said ion guide in the first mode of operation. Alternatively, in the second mode of operation, the one or more downstream mass analyzers may be configured to generate one or more product ions from said plurality of ions for detection by the detector as in MS/MS. In some related aspects, for example, the one or more downstream mass analyzers may comprise a collision cell in which the plurality of ions may be fragmented by collision induced dissociation. In such aspects, the second mode of operation may be effective to reduce collision energy of a collision induced dissociation of said plurality of ions within said collision cell relative to the collision energy required to dissociate said ions in the first mode of operation.

In various aspects in accordance with the present teachings, the likelihood of electron detachment from said plurality of ions during transmission through said ion guide in the first mode of operation may be less than the likelihood of electron detachment from said plurality of ions during transmission through said ion guide in the second mode of operation. Additionally, in certain aspects, electron detachment may cause fragmentation of the plurality of ions during transmission through said ion guide in the second mode of operation. For example, the likelihood of fragmentation of said plurality of ions in the second mode of operation may be greater than a likelihood of fragmentation of said plurality of ions during transmission through said ion guide in the first mode of operation.

In various aspects, charge reduction in the second mode of operation may result in the formation of radical ions within the ion guide. For example, in the second mode of operation, a population of free radical species may be more likely to be generated from said plurality of ions during transmission through the ion guide in the second mode of operation.

As discussed above, the front end ion guide may be disposed in a first vacuum chamber maintained at pressures greater than about 500 mTorr, and may be configured to transmit the plurality of ions to a second vacuum chamber maintained at a lower pressure relative to the first vacuum chamber. By way of example, the pressure within first vacuum chamber may be in a range of about 1 to 10 Torr. In certain aspects, the pressure within the second vacuum chamber may be in a range of about 3 mTorr to about 15 mTorr. The pressure within the ionization chamber (e.g., from which the ions are transmitted into the inlet of the ion guide) may be about 760 Torr.

In various aspects, a method of operating a mass spectrometer in accordance with the present teachings is provided, the method comprising receiving a plurality of ions generated by an ion source through an inlet of a first vacuum chamber maintained at a pressure above about 500 mTorr. Said plurality of ions may be transmitted through an ion guide disposed in the first vacuum chamber, wherein the ion guide comprises a plurality of rods extending along a central longitudinal axis from a proximal end disposed adjacent the inlet to a distal end, the plurality of rods being spaced apart from the central longitudinal axis and configured to define an internal volume within which the plurality of ions received through the inlet are entrained by a flow of gas. The method may also comprises adjusting an amplitude of a RF voltage signal provided to the plurality of rods so as to alternatively operate the ion guide in a first mode of operation in which an isotopic distribution of said plurality of ions is substantially maintained during transmission through said ion guide and a second mode of operation in which the plurality of ions being transmitted therethrough are more likely subject to electron detachment, wherein the amplitude of the RF voltage signal in the first mode of operation is less than the amplitude of the RF voltage signal in the second mode of operation. At least a portion of the plurality of ions may be transmitted through an exit of the first vacuum chamber to a second vacuum chamber maintained at a lower pressure relative to the first vacuum chamber. In certain aspects, the plurality of ions may be generated at about atmospheric pressure.

The RF voltage signal applied to the plurality of rods in the first and/or second mode of operation can have a variety of values in accordance with various aspects of the present teachings. By way of example, the RF voltage signal in the first mode of operation may be equal to or less than about 200 $V_{p-p}$ and the RF voltage signal in the second mode of operation may be equal to or greater than about 250 $V_{p-p}$. In some aspects, the maximum of the RF voltage signal in the first mode of operation may be 210 $V_{p-p}$ and/or the maximum of the RF voltage signal in the second mode of operation may be about 300 $V_{p-p}$.

In various aspects, the m/z of at least a portion of said plurality of ions transmitted through the ion guide in the first mode of operation may be detected substantially without fragmenting said plurality of ions after transmission from said ion guide.

In various aspects, one or more downstream mass analyzers may be configured to generate one or more product ions from said plurality of ions in the second mode of operation. In certain related aspects, the method may further comprise detecting the m/z of said one or more product ions.

BRIEF DESCRIPTION OF THE DRAWINGS

The skilled person in the art will understand that the drawings, described below, are for illustration purposes only. The drawings are not intended to limit the scope of the applicant's teachings in any way.

DETAILED DESCRIPTION

It will be appreciated that for clarity, the following discussion will explicate various aspects of embodiments of the applicant's teachings, while omitting certain specific details wherever convenient or appropriate to do so. For example, discussion of like or analogous features in alternative embodiments may be somewhat abbreviated. Well-known ideas or concepts may also not be discussed in any great detail for brevity. The skilled person will recognize that some embodiments of the applicant's teachings may not require certain of the specifically described details in every implementation, which are set forth herein only to provide a thorough understanding of the embodiments. Similarly, it will be apparent that the described embodiments may be susceptible to alteration or variation according to common general knowledge without departing from the scope of the disclosure. The following detailed description of embodiments is not to be regarded as limiting the scope of the applicant's teachings in any manner.

As used herein, the terms "about" and "substantially equal" refer to variations in a numerical quantity that can occur, for example, through measuring or handling procedures in the real world; through inadvertent error in these procedures; through differences in the manufacture, source, or purity of compositions or reagents; and the like. Typically, the terms "about" and "substantially" as used herein means 10% greater or lesser than the value or range of values stated or the complete condition or state. For instance, a concentration value of about 30% or substantially equal to 30% can mean a concentration between 27% and 33%. The terms also refer to variations that would be recognized by one skilled in the art as being equivalent so long as such variations do not encompass known values practiced by the prior art.

In order to assign an accurate mass to an intact ion species, any modification to the ion species as it is transmitted to the mass analyzer(s) for separation and detection should be known or controlled. Failing to account for such modifications may lead to improper assignment of species through isotope profile matching of the expected ions or a deconvolution artefact of the multiply-charged ion signal that can be interpreted as a new or different species.

Figure 1A:
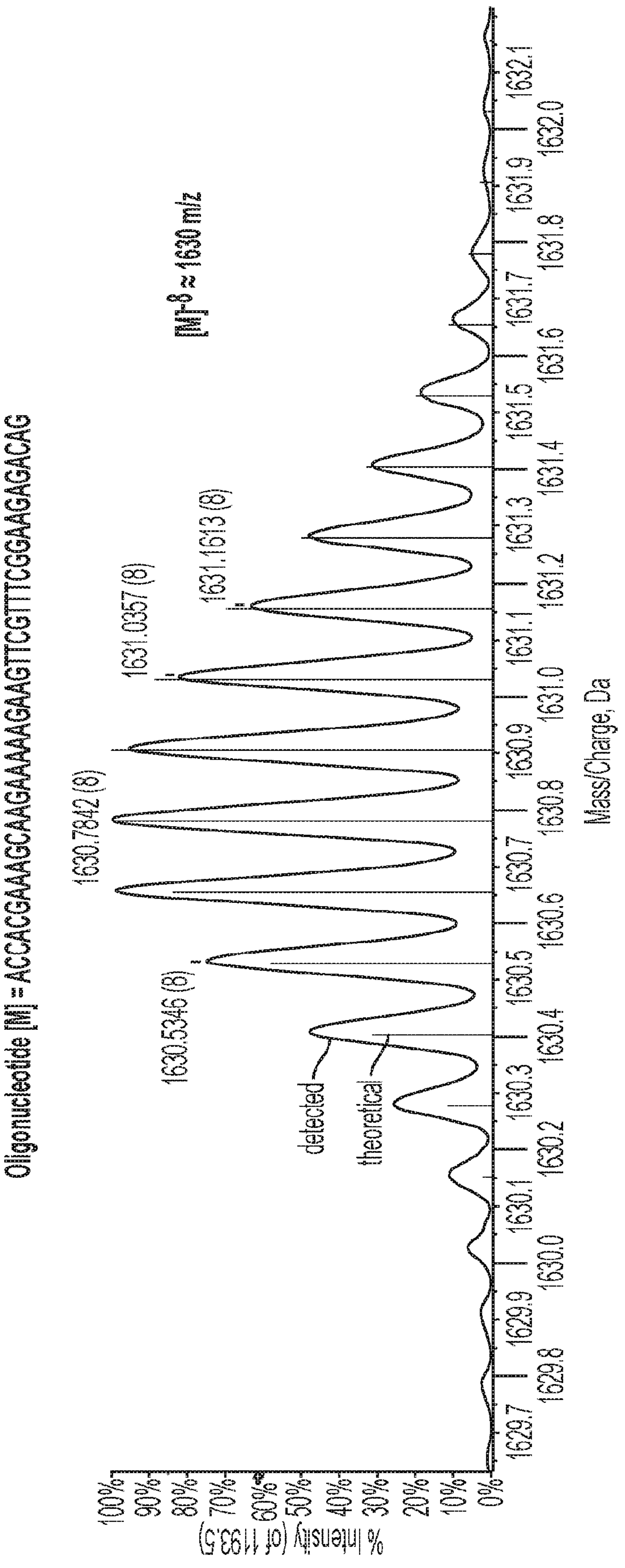
FIGS. 1A-B depict example isotopic distributions of various charge states of multiply-charged analyte.
Figure 1B:
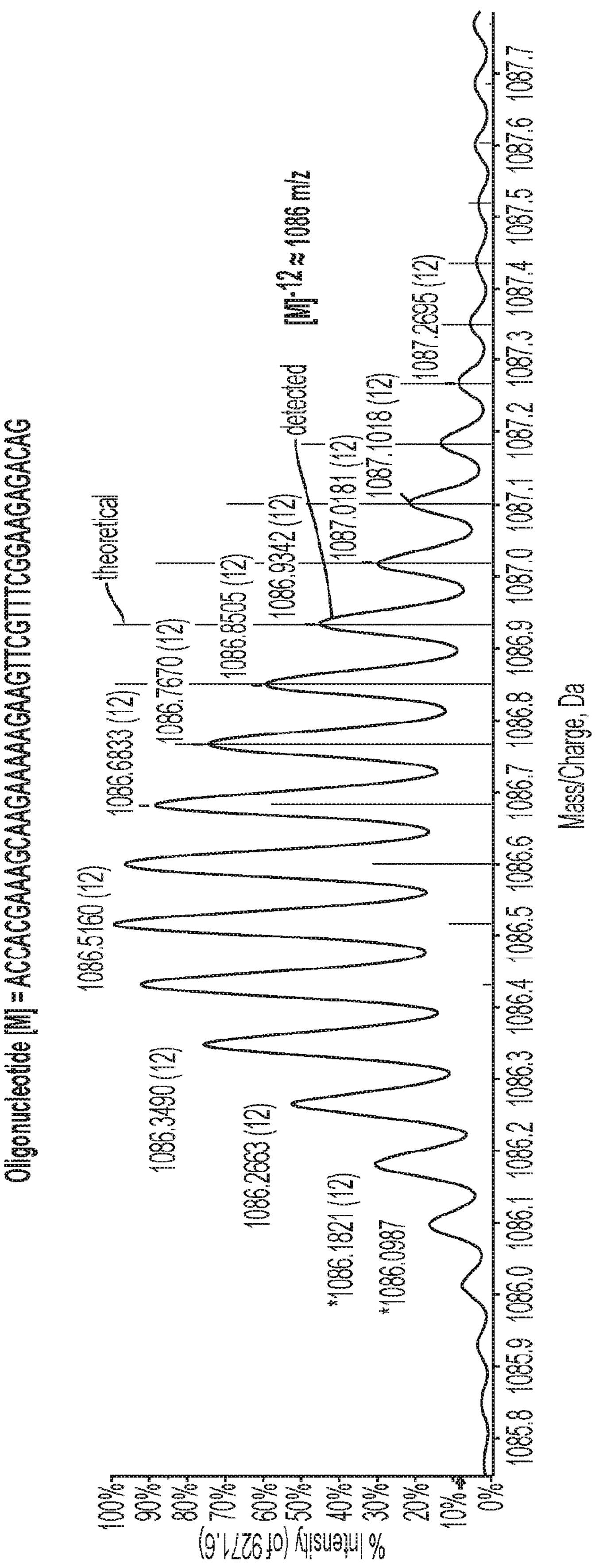

Data regarding an analyte subject to atmospheric pressure ionization as detected by MS performed in accordance with conventional practices are depicted in FIGS. 1A-B. In particular, FIGS. 1A-B depict mass spectrum following the ionization of a 44-nucleotide sequence (AC-CACGAAAGCAAGAAAAAGAAGTTCGTTTCG-GAAGAGACAG) at atmospheric pressure using a Turbo V™ Ion Source operated in negative ionspray mode. The ions were analyzed using MS on a Triple ToF® 6600+ System, which included a high pressure front end ion guide, as conventionally used to focus the ions into an ion beam as they are transmitted from the atmospheric pressure ionization chamber to the high-vacuum, downstream mass analyzer(s). The spectrum FIG. 1A represent the ions that are transmitted to the mass analyzer exhibiting a −8 charge, with each individual peak at a different m/z due to the incorporation of one or more isotopes into the oligonucleotide. The height of the peaks suggest the relative quantity of the oligonucleotide ions at each detected m/z, thereby resulting in an isotopic distribution. FIG. 1B likewise depicts the detected isotopic distribution of the oligonucleotide anions exhibiting a −12 charge that are detected according to conventional MS systems. The vertical lines added to the spectrum of FIGS. 1A and 1B represent the expected quantity at a particular m/z in light of the oligonucleotide constituent elements' natural isotopic abundance. Notably, the theoretical isotopic distribution is identical for the −8 and −12 charge states. While FIG. 1A indicates an acceptable correspondence between the detected and theoretical isotopic distributions at the −8 charge state, the detected isotopic distribution for the −12 charge state varied significantly from the theoretical distribution. That is, as shown in FIG. 1B, the detected isotopic distribution significantly shifts toward lower m/z (i.e., to the left). Peaks detected at an m/z lower than the smallest expected m/z of the theoretical distribution could be incorrectly interpreted as a different species (as seen on the left side of FIG. 1B), while the right side of FIG. 1B indicates a significantly lower quantity at each m/z than expected by a natural isotopic distribution.

Figure 2A:
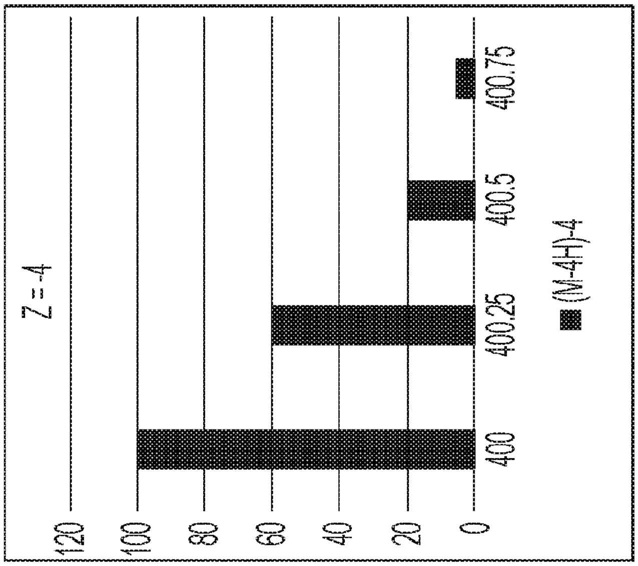
FIGS. 2A-C depict other example isotopic distributions of various charge states of multiply-charged analyte.
Figure 2B:
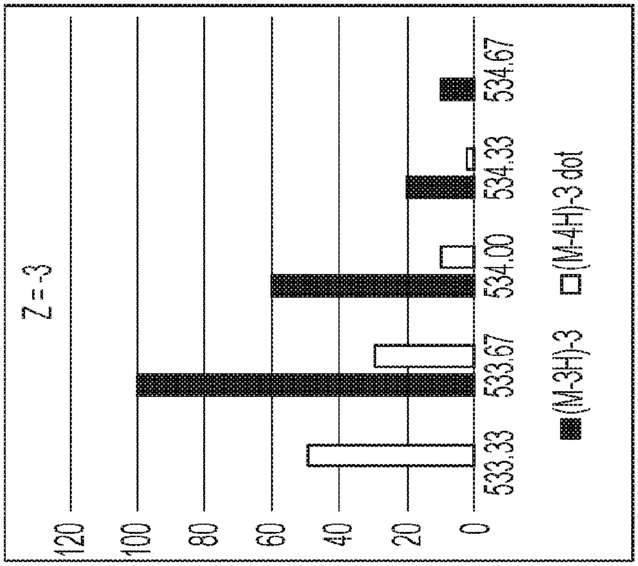
Figure 2C:
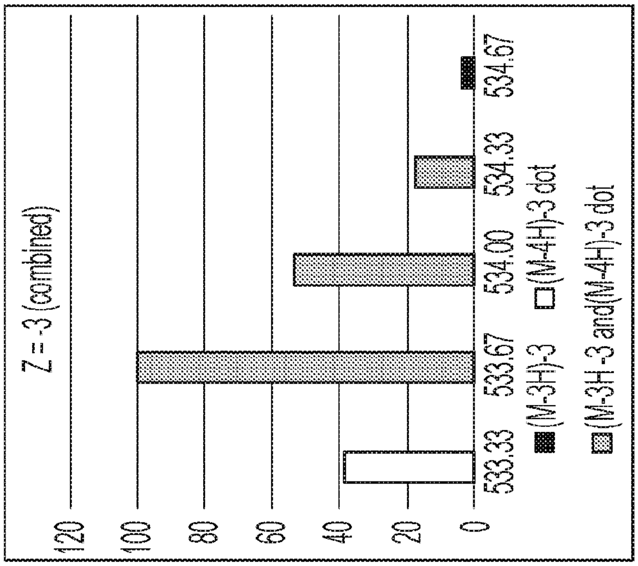

With reference now to FIGS. 2A-C and without being bound by any particular theory, the inventors of the present application postulated that such a shift in the isotopic distribution of multiply-charged anions could have resulted from the analyte subject to proton exchange during ionization by an ion source losing one or more electrons prior to being transmitted to the mass analyzer. In particular, these hypothetical mass spectrum demonstrate the potential effect of charge reduction on the isotopic distribution following ionization of a hypothetical analyte [M] as separated and detected by MS.

FIG. 2A depicts a hypothetical isotopic distribution of the −4 charge state $[M-4H]^{4-}$ if these anions had been transmitted to the mass analyzer without modification. As shown, anions $[M-4H]^{4-}$ exhibit ~400 m/z, with the four black bars indicating four isotopes at 400 m/z, 400.25 m/z, 400.5 m/z, and 400.75 m/z. It would be expected that ions generated by the ion source having a −3 charge state (i.e., $[M-3H]^{3-}$) would exhibit the same relative isotopic distribution as that of the −4 charge state ions. This distribution is shown by the black bars in FIG. 2B, which depicts the same four isotopes at a −3 charge state (i.e., 533.67 m/z, 534 m/z, 534.33 m/z, and 534.67 m/z) corresponding to the various m/z of the −4 charge state anions of FIG. 2A when taking into account the lower charge (i.e., −3) and the mass of an additional proton in $[M-3H]^{3-}$ relative to $[M-4H]^{4-}$.

FIG. 2B additionally includes four white bars at 533.33 m/z, 533.67 m/z, 534 m/z, and 534.33 m/z. The relative distribution between the m/z of the four white bars ions corresponds to that of the black bars in FIG. 2B (and in FIG. 2A), though the identity of the m/z is not identical. For example, the lowest m/z of the white bars in FIG. 2B (i.e., 533.33 m/z) is not present in the black bars of FIG. 2B. Moreover, the highest m/z of the black bars in FIG. 2B (i.e., 534.67 m/z) is lacking in the white bars. Notably, the 533.33 m/z corresponds to the mass of a $[M-4H]^{4-}$ anion that has lost an electron (i.e., $[M-4H]^{3-\cdot}$, wherein the dot represents a radical ion). Unlike in proton exchange occurring during ionization that affects both charge and mass, electron loss during transmission of these ions from the ion source to the mass analyzer would reduce the charge state from −4 to −3 without substantially reducing the ion's mass. Each of the white bars in FIG. 2B therefore represents −4 charge state anions $[M-4H]^{4-}$ generated by the ion source that have been charge-reduced to $[M-4H]^{3-\cdot}$ prior to being analyzed according to their m/z at the mass analyzer.

When actually analyzing the −3 charge state via MS at ~534 m/z, however, a detector would identify five m/z as shown in FIG. 2C: 533.33 m/z ($[M-4H]^{3-\cdot}$ only, white bar); 533.67 m/z, 534 m/z, and 534.33 m/z ($[M-4H]^{4-}$ and $[M-4H]^{3-\cdot}$, gray bar); and 534.67 m/z ($[M-4H]^{4-}$ only, black bar). The height of the gray bars in FIG. 2C reflects the summed heights of the black bars and white bars in FIG. 2B at each m/z. In sum, it is believed that the above theoretical description of the leftward shift in the isotopic distribution of FIG. 2C (i.e., toward lower m/z) corroborates the distortion in the isotopic distribution depicted in FIG. 1B. Moreover, if one were unaware that the multiply-charge ions had been charge reduced prior to arriving at the mass analyzer, the presence of the lowest 533.33 m/z in FIG. 2C could lead one to believe that another isotope was present at the −3 charge state or that this artefact represented the ion of a different analyte exhibiting ~534 m/z. Further, detection of the charge-reduced anions $[M-4H]^{3-\cdot}$ distorts the quantity of the non-charged reduced isotopes of $[M-3H]^{3-\cdot}$ in FIG. 2C at each expected m/z. For example, wherein the 400.25 m/z is about 60% of the quantity of the most intense 400 m/z in FIG. 2A, the corresponding 534.00 m/z in FIG. 2B is only about 55% of the most intense 533.67 m/z.

Following the recognition of such potential errors caused by charge reduction, applicant surprisingly discovered in accordance with various aspects of the present teachings that the likelihood of charge reduction can be adjusted through the control of the amplitude of the RF voltage applied to the rods of a front end, high pressure ion guide through which the ions are transmitted between the ion source and the downstream mass analyzer(s). Generally, the RF signal applied to the rods of the front end ion guides are conventionally utilized merely to focus the ions into an ion beam as they are transmitted through the intermediate pressure chambers. However, systems and methods in accordance with various aspects of the present teachings can help maintain m/z fidelity by decreasing the RF amplitude voltages applied to the rods of the upstream ion guides to nonetheless ensure proper transmission of an ion beam while reducing the charge state modification and/or fragmentation of the multiply-charged species therein. By reducing artefacts caused by such charge-reduced species, the present teachings can enable more accurate data deconvolution and characterization of the intact analytes present in the ionized sample (e.g., as detected in MS).

Moreover, whereas conventional front end ion guides generally attempt to transmit the ions generated by the ion source to the vacuum chambers in which the mass analyzer(s) are disposed without modification, the present teachings enable an additional method of controlled modification that is conventionally relegated to downstream mass analyzers. For example, various aspects of methods and systems described herein for controlling charge state can be utilized to increase the likelihood of electron detachment from multiply-charged ions within the high-pressure ion guide. In certain example aspects, systems and methods described herein can increase the RF amplitude voltages applied to the rods of the upstream ion guide, which may result in fragmentation of the ions within the high pressure ion guide and/or the formation of radical ion species. It has been discovered, for example, that radical ions formed in the high pressure region may require reduced energy to dissociate within a downstream collision cell and/or may cause fragmentation to occur at more or different sites within the radical ions, which may aid in the reconstruction of the overall analyte structure based on the identity of the various ion fragments (e.g., as detected in MS/MS).

Figure 3:
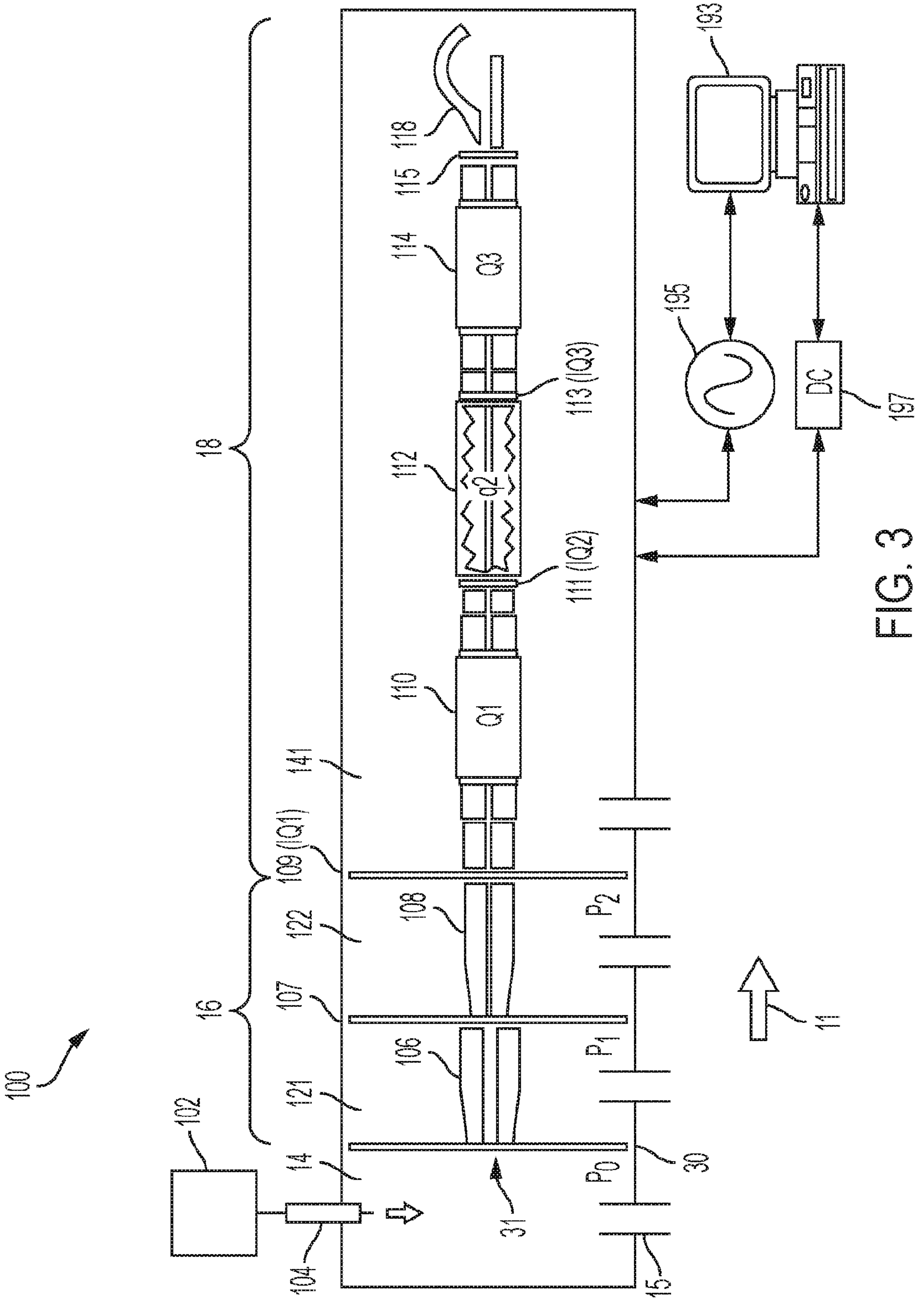
FIG. 3 is a schematic representation of an exemplary mass spectrometer system in accordance with an aspect of various embodiments of the applicant's teachings.

FIG. 3 schematically depicts a mass spectrometer system 100 in accordance with various aspects of the present teachings that can provide improved charge state control of ions in a relatively high pressure, front end ion guide. As shown, the exemplary mass spectrometer system 100 can comprise an ion source 104 for generating ions within an ionization chamber 14, an upstream section 16, and a downstream section 18. The upstream section 16 is configured to perform initial processing of ions received from the ion source 104, and includes various elements such as a curtain plate 30 and one or more ion guides 106, 108. The downstream section 18 includes one or more mass analyzers 110, 114, a collision cell 112, and a detector 118. A controller 193, which is operably connected to one or more power supplies 195, 197, can control the RF signal applied to the ion guide 106 so as to adjust the likelihood of electron detachment from ions in the upstream section 16, as discussed otherwise herein. It will be appreciated that though such charge state control will generally be described with reference to the example system 100 of FIG. 1 as being applied to the ion guide 106 (e.g., a QJet ion guide), charge state control in accordance with the present teachings may be performed in any upstream ion guide operating at pressures above about 500 mTorr.

The ion source 104 can be any known or hereafter developed ion source for generating ions and modified in accordance with the present teachings. Non-limiting examples of ion sources suitable for use with the present teachings include atmospheric pressure chemical ionization (APCI) sources, electrospray ionization (ESI) sources, continuous ion source, a pulsed ion source, a matrix-assisted laser desorption/ionization (MALDI) ion source, an electron impact ion source, a chemical ionization source, or a photoionization ion source, among others. Additionally, as shown in FIG. 1, the system 100 can include a sample source 102 configured to provide a sample to the ion source 104. The sample source 102 can be any suitable sample inlet system known in the art. By way of example, the ion source 104 can be configured to receive a fluid sample from a variety of sample sources, including a reservoir containing a fluid sample that is delivered to the sample source (e.g., pumped), a liquid chromatography (LC) column, a capillary electrophoresis device, and via an injection of a sample into a carrier liquid. In the example depicted in FIG. 3, the ion source 104 comprises an electrospray electrode, which can comprise a capillary fluidly coupled to the sample source 102 (e.g., through one or more conduits, channels, tubing, pipes, capillary tubes, etc.), and which terminates in an outlet end that at least partially extends into the ionization chamber 14 to discharge the liquid sample therein.

One or more power supplies can supply power to the ion source 104 with appropriate voltages for ionizing the analytes in either positive ion mode (analytes in the sample are protonated, generally forming the cations to be analyzed) or negative ion mode (analytes in the sample are deprotonated, generally forming the anions to be analyzed). As shown, for example, the system 100 includes an RF power supply 195 and DC power supply 197 that can be controlled by a controller 193 so as to apply electric potentials having RF, AC, and/or DC components to the various components of the system 100. Further, the ion source 104 can be nebulizer-assisted or non-nebulizer assisted. In some embodiments, ionization can also be promoted with the use of a heater, for example, to heat the ionization chamber so as to promote dissolution of the liquid discharged from the ion source.

With continued reference to FIG. 3, the analytes, contained within the sample discharged from the ion source 104, can be ionized within the ionization chamber 14, which is separated from the upstream section 16 by the curtain plate 30. The curtain plate 30 can define a curtain plate aperture 31, which is in fluid communication with the upstream section 16. Although not shown in FIG. 3, the system 100 can include various other components. For example, the system 100 can include a curtain gas supply (not shown) that provides a curtain gas flow (e.g., of $N_2$) to the upstream section 16 of the system 100. The curtain gas flow can aid in keeping the downstream section 18 of the mass spectrometer system 100 clean (e.g., by de-clustering and evacuating large neutral particles). For example, a portion of the curtain gas can flow out of the curtain plate aperture 31 into the ionization chamber 14, thereby preventing the entry of droplets and/or neutral molecules through the curtain plate aperture 31.

The ionization chamber 14 can be maintained at a pressure $P_0$, which can be atmospheric pressure or a substantially atmospheric pressure. However, in some embodiments, the ionization chamber 14 can be evacuated to a pressure lower than atmospheric pressure. The ions generated by the ion source 104 generally travel towards the vacuum chambers 121, 122, 141, in the direction indicated by the arrow 11 in FIG. 3.

The ions generated by the ion source 104 generally travel towards the vacuum chambers 121, 122, 141 in the direction indicated by the arrow 11 in FIG. 3. Initially, these ions can be successively transmitted through the elements of the upstream section 16 (e.g., curtain plate 30, ion guide 106, and ion guide 108) to result in a narrow and highly focused ion beam (e.g., along the central longitudinal axis of the system 100) for further m/z-based analysis within the downstream portion 18. The ions generated by the ion source 104 enter the upstream section 16 to traverse one or more intermediate vacuum chambers 121, 122 and/or ion guides 106, 108 having elevated pressures greater than the high vacuum chamber 141 within which the mass analyzers are disposed. The pressure ($P_1$) of the vacuum chamber 121 can be maintained at a pressure ranging from approximately 500 mTorr to approximately 10 Torr, although other pressures can be used for this or for other purposes. For example, in some aspects, the first vacuum chamber 121 can be maintained at a pressure above about 500 mTorr. In certain implementations, the first vacuum chamber can be maintained at a pressure in a range from about 0.5 Torr to about 10 Torr. Similarly, vacuum chamber 122 can be evacuated to a pressure ($P_2$) that is lower than that of first vacuum chamber 121 (i.e., $P_1$). For example, the second vacuum chamber 122 can be maintained at a pressure of about 3 to 15 mTorr, although other pressures can be used for this or for other purposes.

Such elevated pressures are generally considered unsuitable for m/z-based separation due to the increased risk of collisions with other molecules. As such, front end guides have conventionally been utilized to merely provide collisional cooling and radial focusing of the ions into an ion beam using a combination of gas dynamics and radio frequency fields as they are transmitted to the downstream high-vacuum section 18. Indeed, uncontrolled modifications to the ions generated by the ion source 104 are generally unwanted in the high-pressure front end ion guides to preserve the m/z of the ions generated by the ion source 104 to avoid aberrations in the m/z-based separation performed in the downstream mass analyzer(s) during MS analysis and/or selection of the MS/MS precursors. As discussed below with reference to FIGS. 4A-C, however, ion guide 106 can be an RF ion guide comprising a quadrupole rod set configured to not only collisionally cool and radially focus the ions as they are transmitted through the intermediate pressure chamber 121, but can additionally provide for the controlled modification of the ions' charge state by adjusting the amplitude of the RF voltage signal depending on the desired mode of operation.

The ion guide 106 transfers the ions to subsequent ion optics such as ion guide 108 (also referenced herein as "Q0") through an ion lens 107 (also referenced herein as "IQ0"). The ions can be transmitted from ion guide 106 through an exit aperture in the ion lens 107. The ion guide Q0 108 can be an RF ion guide and can comprise a quadrupole rod set. This ion guide Q0 108 can be positioned in a second vacuum chamber 122 and so as to transport ions through an intermediate pressure region prior to delivering ions through the subsequent optics (e.g., IQ1 lens 109) to the downstream section 18 of system 100.

Ions passing through the quadrupole rod set Q0 108 pass through the lens IQ1 109 and into the adjacent quadrupole rod set Q1 110 in the downstream section 18. After being transmitted from Q0 108 through the exit aperture of the lens IQ1 109, the ions can enter the adjacent quadrupole rod set Q1 110, which can be situated in a vacuum chamber 141 that can be evacuated to a pressure that can be maintained lower than that of the ion guide 106 chamber 121 and the ion guide Q0 108 chamber 122. For example, the vacuum chamber 141 can be maintained at a pressure less than about $1\times10^{-4}$ Torr or lower (e.g., about $5\times10^{-5}$ Torr), though other pressures can be used for this or for other purposes. As will be appreciated by a person of skill in the art, the quadrupole rod set Q1 110 can be operated as a conventional transmission RF/DC quadrupole mass filter that can be operated to select an ion of interest and/or a range of ions of interest. For example, the quadrupole rod set Q1 110 can be provided with RF/DC voltages suitable for operation in a mass-resolving mode (e.g., by one or more voltage supplies 195/197). As should be appreciated, taking the physical and electrical properties of mass analyzer Q1 110 into account, parameters for an applied RF and DC voltage can be selected so that Q1 110 establishes a transmission window of chosen m/z ratios, such that these ions can traverse Q1 110 largely unperturbed. Ions having m/z ratios falling outside the window, however, do not attain stable trajectories within the quadrupole and can be prevented from traversing the quadrupole rod set Q1 110. It should be appreciated that this mode of operation is but one possible mode of operation for Q1 110. By way of example, the lens IQ2 111 between Q1 110 and collision cell q2 112 can be maintained at a much higher offset potential than Q1 110 such that the quadrupole rod set Q1 110 can be operated as an ion trap. In such a manner, the potential applied to the entry lens IQ2 111 can be selectively lowered (e.g., mass selectively scanned) such that ions trapped in Q1 110 can be accelerated into collision cell q2 112, which could also be operated as an ion trap, for example.

Ions passing through the quadrupole rod set Q1 110 can pass through the lens IQ2 111 and into the adjacent quadrupole rod set q2 112, which as shown can be disposed in a pressurized compartment and can be configured to operate as a collision cell at a pressure approximately in the range of from about 1 mTorr to about 10 mTorr, though other pressures can be used for this or for other purposes. A suitable collision gas (e.g., nitrogen, argon, helium, etc.) can be provided by way of a gas inlet (not shown) to thermalize and/or fragment ions in the ion beam. By way of example, in MS/MS, the quadrupole rod set Q1 110 can be operated to transmit to q2 112 precursor ions exhibiting a selected range of m/z for fragmentation into product ions within q2 112. In MS mode, the parameters for RF and DC voltages applied to the rods of q2 112 can be selected so that q2 transmits these ions therethrough largely unperturbed.

Ions that are transmitted by quadrupole rod set q2 112 can pass into the adjacent quadrupole rod set Q3 114, which is bounded upstream by IQ3 113 and downstream by the exit lens 115. As will be appreciated by a person skilled in the art, the quadrupole rod set Q3 114 can be operated at a decreased operating pressure relative to that of collision cell q2 112, for example, less than about $1\times10^{-4}$ Torr (e.g., about $5\times10^{-5}$ Torr), though other pressures can be used for this or for other purposes. As will be appreciated by a person skilled in the art, quadrupole rod set Q3 114 can be operated in a number of manners, for example, as a scanning RF/DC quadrupole, as a linear ion trap, or as a RF-only ion guide to allow the ions to pass therethrough unperturbed. Following processing or transmission through Q3 114, the ions can be transmitted into the detector 118 through the exit lens 115. The detector 118 can then be operated in a manner known to those skilled in the art in view of the systems, devices, and methods described herein. As will be appreciated by a person skill in the art, any known detector, modified in accord with the teachings herein, can be used to detect the ions.

Although, for convenience, the mass analyzers 110, 114 and collision cell 112 are described herein as being quadrupoles having elongated rod sets (e.g., having four rods), a person of ordinary skill in the art should appreciate that these elements can have other suitable configurations. It will also be appreciated that the one or more mass analyzers 110, 114 can be any of triple quadrupoles, linear ion traps, quadrupole time of flights, Orbitrap or other Fourier transform mass spectrometers, all by way of non-limiting examples. For example, as discussed with reference to the example data depicted in FIG. 1 and FIGS. 5-8 obtained with a Triple ToF® 6600+ mass spectrometer system, Q3 of FIG. 3 may be replaced with a time-of-flight mass analyzer.

Figure 4A:
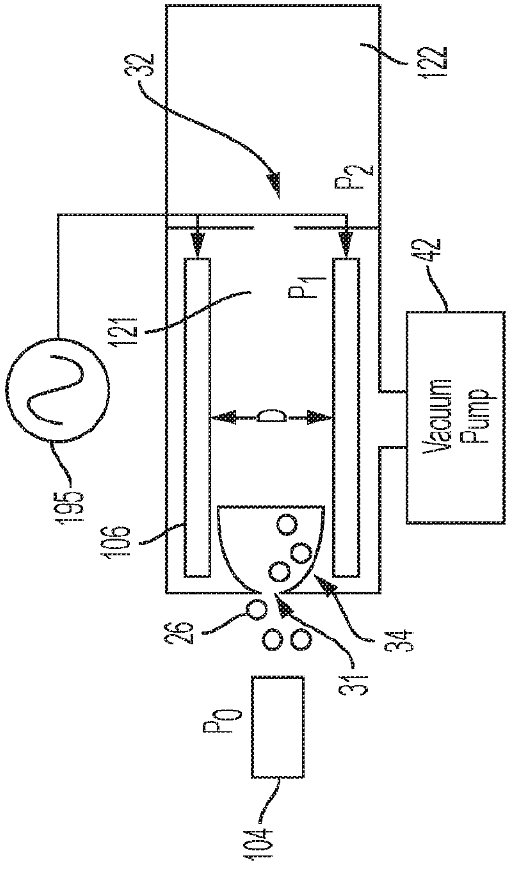
FIGS. 4A-C schematically depict a portion of the system of FIG. 1 in additional detail in accordance with an aspect of various embodiments of the applicant's teachings.
Figure 4B:
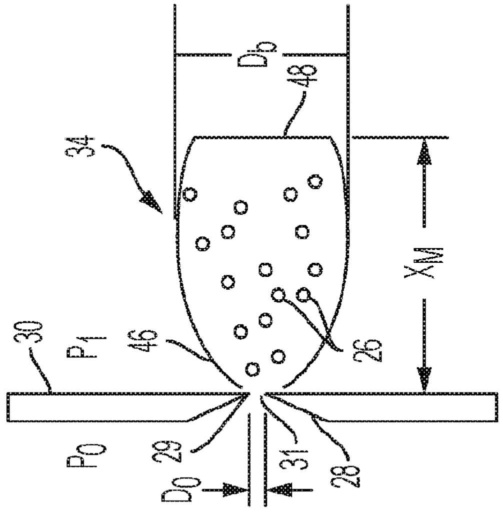
Figure 4C:
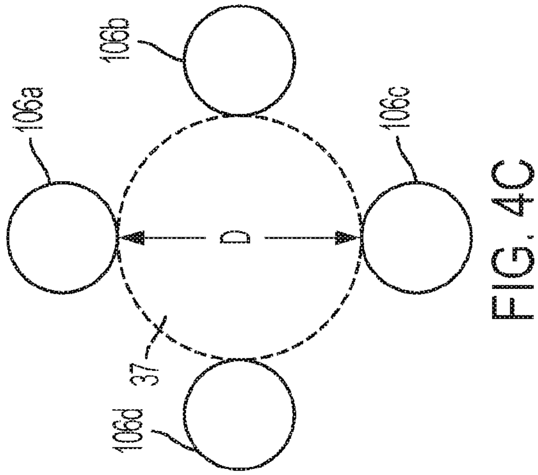

FIGS. 4A-C depict the ion guide 106 of FIG. 3 in additional detail. As shown in FIG. 4A, ions 26 generated by the ion source 104 entering the first vacuum chamber 121 through an inlet aperture 31 may be entrained by a supersonic flow of gas, commonly referred to as a supersonic free jet expansion 34, as described in detail in U.S. patent application Ser. No. 11/315,788 (U.S. Pat. No. 7,259,371), the entire teachings of which is described herein by reference. The first vacuum chamber 121 can comprise an exit aperture 32 located downstream from the inlet aperture 31. The ion guide 106 is positioned between the inlet aperture 31 and the outlet aperture 32. The exit aperture 32 can be an inter-chamber aperture separating the first vacuum chamber 121 from the next or second vacuum chamber 122 that can house additional ion guides or mass analyzers.

The pressure ($P_1$) in the first vacuum chamber 121 can be maintained by pump 42, and power supply 195 can be connected to the various components of the ion guide 106 to provide for radially confining, focusing, and providing charge control of least a portion of the ions 30 as otherwise discussed herein. As best shown in FIG. 4C, the ion guide 106 can be a set of quadrupole rods 106*a-d* with a predetermined cross-section characterized by an inscribed circle with a diameter as indicated by reference letter D (also shown in FIG. 4A), extending along the axial length of the ion guide 106 to define an internal volume 37. The ions 26 can initially pass through an orifice-curtain gas region, generally known in the art for performing desolvation and blocking unwanted particulates from entering the vacuum chamber 121, but for the purpose of clarity, this is not shown in FIGS. 3-4. Each of the rods 106*a-d* that form the quadrupole rod set 106 can be coupled to an RF power supply such that the rods on opposed sides of the central axis together form a rod pair to which a substantially identical RF signal is applied. That is, the rod pair 106*a,c* can be coupled to a first RF power supply that provides a first RF voltage to the first pair of rods at a first frequency and in a first phase. On the other hand, the rod pair 106*b,d* can be coupled to a second RF power supply that provides a second RF voltage at a second frequency (which can be the same as the first frequency), but opposite in phase to the RF signal applied to the first pair of rods 106*a,c*. It will be appreciated that though the rods 106*a-d* of the ion guide 106 are generally referred to herein as quadrupoles (e.g., four rods), the plurality of elongated rods can be any other suitable multipole configurations, for example, hexapoles, octopoles, etc.

To help understand how at least a portion of the ions 26 can be radially confined, focused and transmitted between the inlet and exit apertures 31, 32, reference is now made to FIG. 4B. The adiabatic expansion of a gas, from a nominal high-pressure $P_0$ region (e.g., ionization chamber 14 of FIG. 3), into a region 121 of finite background pressure $P_1$, forms an unconfined expansion of a supersonic free gas jet 34 (also known as a supersonic free jet expansion). The inlet aperture 31 can be where the expansion of the gas through the orifice or nozzle can be divided into two distinct regions based upon the ratio of the flow speed to the local speed of sound. In the high-pressure $P_0$ region, the flow speed near the orifice or the nozzle is lower than the local speed of sound. In this region the flow can be considered subsonic. As the gas expands from the inlet aperture 31 into the background pressure $P_1$, the flow speed increases while the local speed of sound decreases. The boundary where the flow speed is equal to the speed of sound is called the sonic surface. This region is referred to as the supersonic region, or more commonly the supersonic free jet expansion. The shape of the aperture influences the shape of the sonic surface. When the aperture 31 can be defined as a thin plate, the sonic surface can be bowed out towards the $P_1$ pressure region. The use of an ideally shaped nozzle, conventionally comprising a converging-diverging duct can produce a sonic surface that is flat and lies at the exit of the nozzle. The converging portion can also be conveniently defined by a chamfer surface 28, while the volume of the first vacuum chamber 121 can define the diverging portion.

A minimum area location of the converging-diverging duct is often referenced as the throat 29. The diameter of the minimum area or the throat 29 is shown using reference $D_0$ on FIG. 4B. The velocity of the gas passing through the throat 29 becomes "choked" or "limited" and attains the local speed of sound, producing the sonic surface, when the absolute pressure ratio of the gas through the diameter $D_0$ is less than or equal to 0.528. In the supersonic free jet 34, the density of the gas decreases monotonically and the enthalpy of the gas from the high-pressure $P_0$ region is converted into directed flow. The gas kinetic temperature drops and the flow speed exceeds that of the local speed of sound (hence the term supersonic expansion).

As shown in FIG. 4B, the expansion can comprise a concentric barrel shock 46 and terminated by a perpendicular shock known as the Mach disc 48. As the ions 26 enter the first vacuum chamber 121 through the inlet aperture 31, they are entrained in the supersonic free jet 34 and since the structure of the barrel shock 46 defines the region in which the gas and ions expand, virtually all of the ions 26 that pass through the inlet aperture 31 are confined to the region of the barrel shock 46. It is generally understood that the gas downstream of a Mach disc 48 can re-expand and form a series of one or more subsequent barrel shocks and Mach discs that are less well-defined compared to the primary barrel shock 46 and primary Mach disc 48. The density of ions 26 confined in the subsequent barrel shocks and Mach discs, however, can be correspondingly reduced as compared to the ions 26 entrained in the primary barrel shock 46 and the primary Mach disc 48.

The supersonic free jet expansion 34 can be generally characterized by the barrel shock diameter $D_b$, typically located at the widest part as indicated in FIG. 4B, and the downstream position $X_m$ of the Mach disc 48, as measured from the inlet aperture 31, more precisely, from the throat 29 of the inlet aperture 31 producing the sonic surface. The $D_b$ and $X_m$ dimensions can be calculated from the size of the inlet aperture, namely the diameter $D_0$, the pressure at the ion source $P_0$ and from the pressure $P_1$ in the vacuum chamber 121, as described, for example, in the paper by Ashkenas, H., and Sherman, F. S., in deLeeuw, J. H., Editor of Rarefied Gas Dynamics, Fourth Symposium IV, volume 2, Academic Press, New York, 1966, p. 84:

$$D_b = 0.412 \times D_0 \times \sqrt{\frac{P_0}{P_1}}, \qquad \text{Eq. (1)}$$

$$X_m = 0.67 \times D_0 \times \sqrt{\frac{P_0}{P_1}}, \qquad \text{Eq. (2)}$$

where $P_0$ is the pressure around the ion source region 14 upstream of the inlet aperture 31 and $P_1$ is the pressure downstream of the aperture 31 as described above. For example, if the diameter of the inlet aperture 31 is approximately 0.6 mm, with a suitable pumping speed so that the pressure in the downstream vacuum chamber 121 is about 2.6 Torr, and $P_0$ is about 760 Torr (atmosphere), from equation (1), the predetermined diameter of the barrel shock $D_b$ is 4.2 mm with a Mach disc 48 located at approximately 7 mm downstream from the throat 29 of the inlet aperture 31, as calculated from equation (2).

The supersonic free jet expansion 34 and barrel shock structure 46 expanding downstream from the throat 29 of the inlet aperture 31 can be an effective method of transporting the ions 26 and confining their initial expansion until the ions 26 are well within the volume 37 of the ion guide 106. The fact that all of the gas and ions 26 are confined to the region of the supersonic free jet 34, within and around the barrel shock 46, means that a large proportion of the ions 26 can be initially confined within the volume 37 if the ion guide 106 is designed to accept the entire or nearly the entire free jet expansion 34. Additionally, the ion guide 106 can be positioned at a location so that the Mach disc 48 can be within the volume 37 of the ion guide 106. By locating the ion guide 106 downstream of the inlet aperture 31, and in a position to include essentially all of the diameter Db of the free jet expansion 34, a larger inlet aperture 31 can be used and thus a higher vacuum chamber 121 pressure $P_1$ can be used while maintaining high efficiency in radially confining and focusing the ions 26 between the apertures 31, 32 thereby to allow more ions into the second vacuum chamber 122.

In the example described above, where the barrel shock 46 diameter $D_b$ is approximately 4.2 mm and the position $X_m$, of the Mach disc 48, measured from the throat of the inlet aperture 31, is about 7 mm, the predetermined cross-section of the ion guide 106 (in this instance, the inscribed circle of diameter D) can be about 4 mm in order for all or essentially all of the confined ions 26 in the supersonic free gas jet 34 to be contained within the volume 37 of the ion guide 106. An appropriate length for the ion guide 106 greater than 7 mm can be chosen so that effective RF ion radial confinement can be achieved. This can result in maximum sensitivity without the necessity of increasing the vacuum pumping capacity and thus the cost associated with larger pumps.

In accordance with equations (1) and (2), the pressure $P_1$ within the vacuum chamber 121 containing the ion guide 106 can contribute to the characterization of the supersonic free jet 34 structure. If the pressure $P_1$ is too low, for example, then the diameter $D_b$ of the barrel shock 46 is large, and the ion guide 106 cannot confine the ions 26 entrained by the supersonic free jet expansion 34. Accordingly, RF voltages applied to the rods 106*a-d* of the ion guide 106 are conventionally set sufficiently high to prevent such ion loss as the ions 26 are transmitted into the internal volume 37 of the ion guide 106. For ions of 400 m/z or greater, for example, it may be common to apply an RF voltage of about 300 $V_{p-p}$ to a conventional upstream ion guide to ensure containment, and thus, substantially 100% ion transmission efficiency.

Figure 5A:
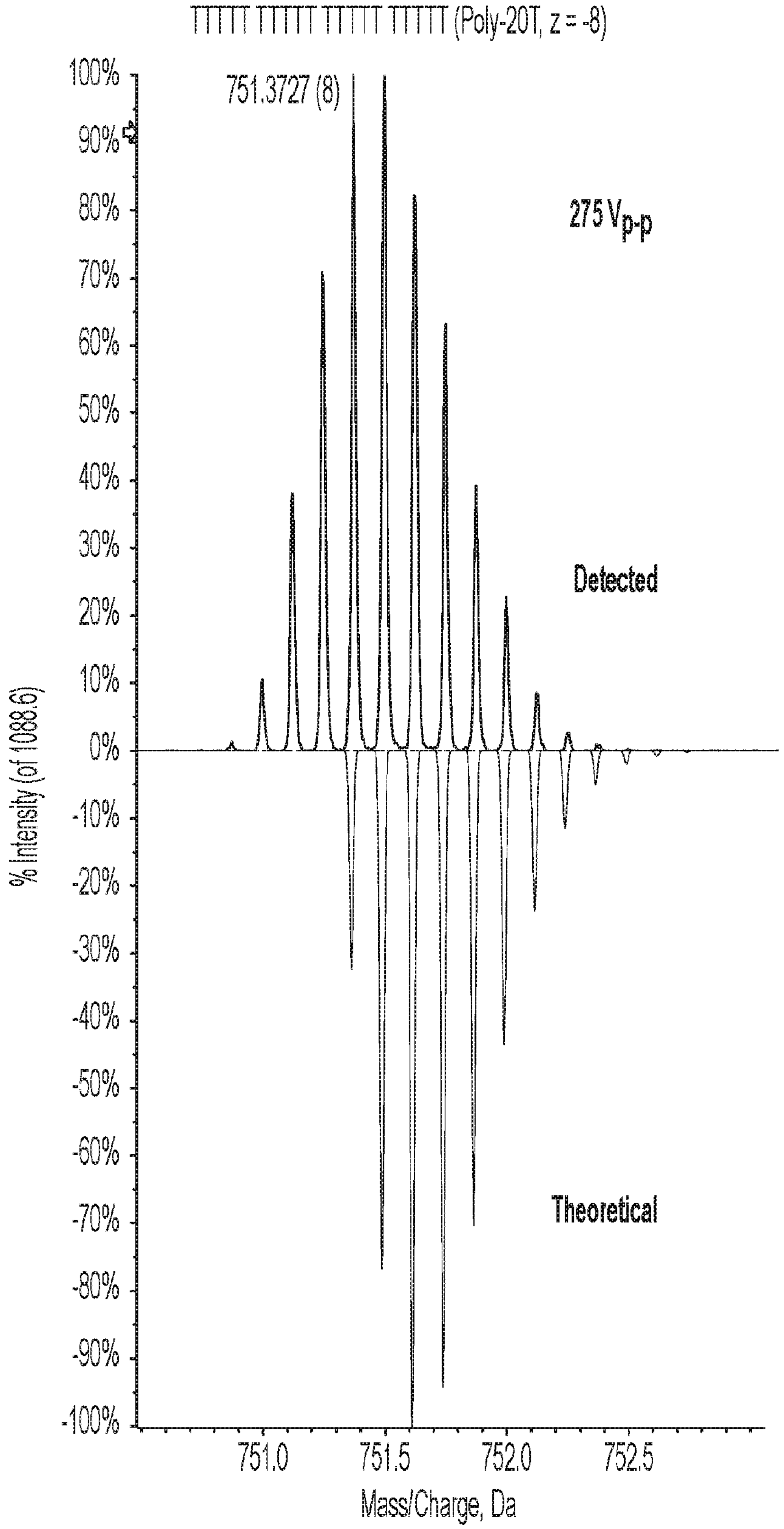
FIGS. 5A-C depict example mass spectrum in MS mode of multiply-charged anions transmitted through a high-pressure ion guide in accordance with an aspect of various embodiments of the applicant's teachings.
Figure 5B:
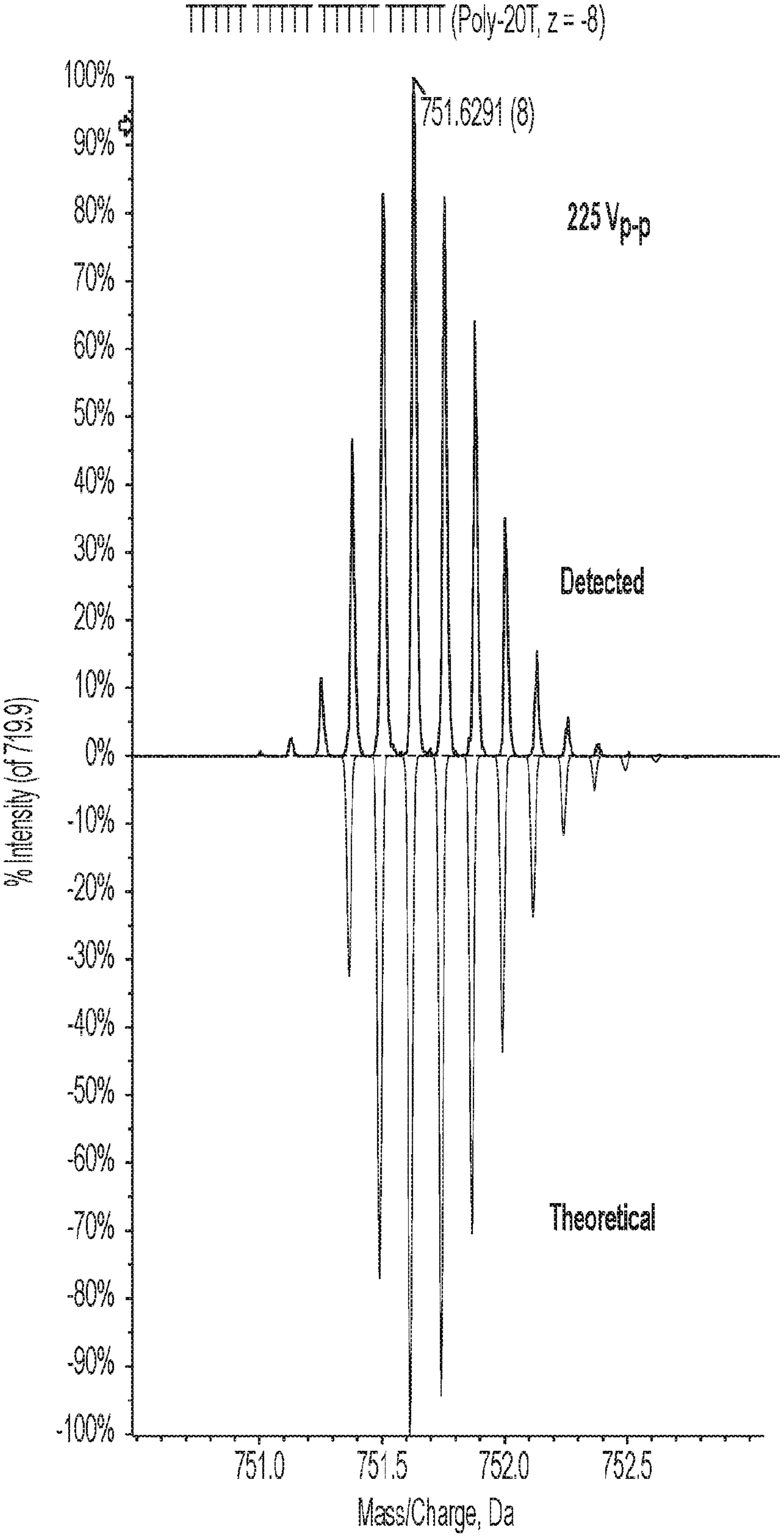
Figure 5C:
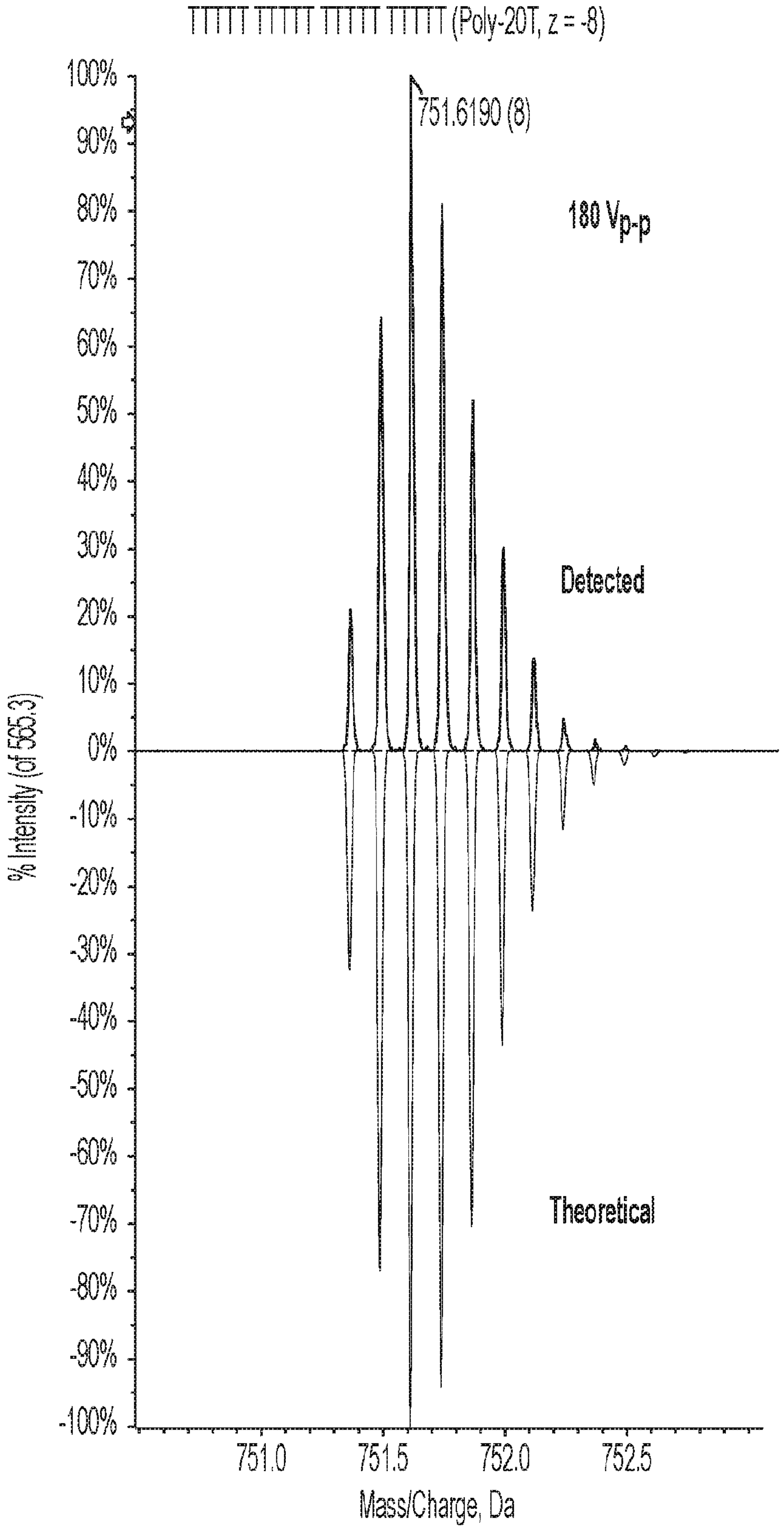

As discussed above, however, conventional systems may unintentionally subject the ions to charge reduction prior to arriving at the downstream mass analyzer(s). Applicants have discovered, however, that by decreasing the amplitude of the RF voltages applied to the rods 106*a-d* of the ion guide 106 it is possible to decrease the likelihood of charge reduction of a multiply-charged species. For example, with reference now to FIGS. 5A-C, a sample of a 20-nucleotide sequence comprising 20 thymine bases (Poly T-20) was subjected to ionization and MS detection utilizing a Triple ToF® 6600+ mass spectrometer system having a front end ion guide QJet, which is substantially as shown in FIG. 3 with Q3 being replaced by a time-of-flight mass analyzer. In each of FIGS. 5A-C, the upper spectrum represents the detected m/z of the ionized Poly T-20 at a −8 charge state (751.6 m/z), while the lower spectrum represents the theoretical spectrum expected according to the natural isotopic abundance of the ionized molecule at a −8 charge state. With particular reference to FIG. 5A, the spectrum was generated with the amplitude of the RF voltage applied to the front end ion guide QJet set to 275 $V_{p-p}$. The leftward m/z shift of the detected isotopic distribution is plainly observed, as well as the presence of ions at unexpected m/z. As discussed above with reference to FIGS. 2A-C, applicants have postulated that such a shift results from the detection of higher charge state ions that have been charge reduced to the −8 charge state during their transmission to the mass analyzer. FIG. 5B similarly depicts a leftward shift in the detected spectrum with an RF amplitude of 225 $V_{p-p}$ applied to the front end ion guide QJet, though the shift is not as substantial as that of FIG. 5A. Finally, FIG. 5C depicts the spectrum of the −8 charge state when the RF amplitude has been reduced to 180 $V_{p-p}$. As shown, the detected spectrum in FIG. 5C is nearly identical to the expected, theoretical spectrum. That is, FIGS. 5A-C demonstrate that decreasing the RF amplitude applied to the front end ion guide may be effective to reduce the likelihood of charge reduction through electron detachment.

Figure 6:
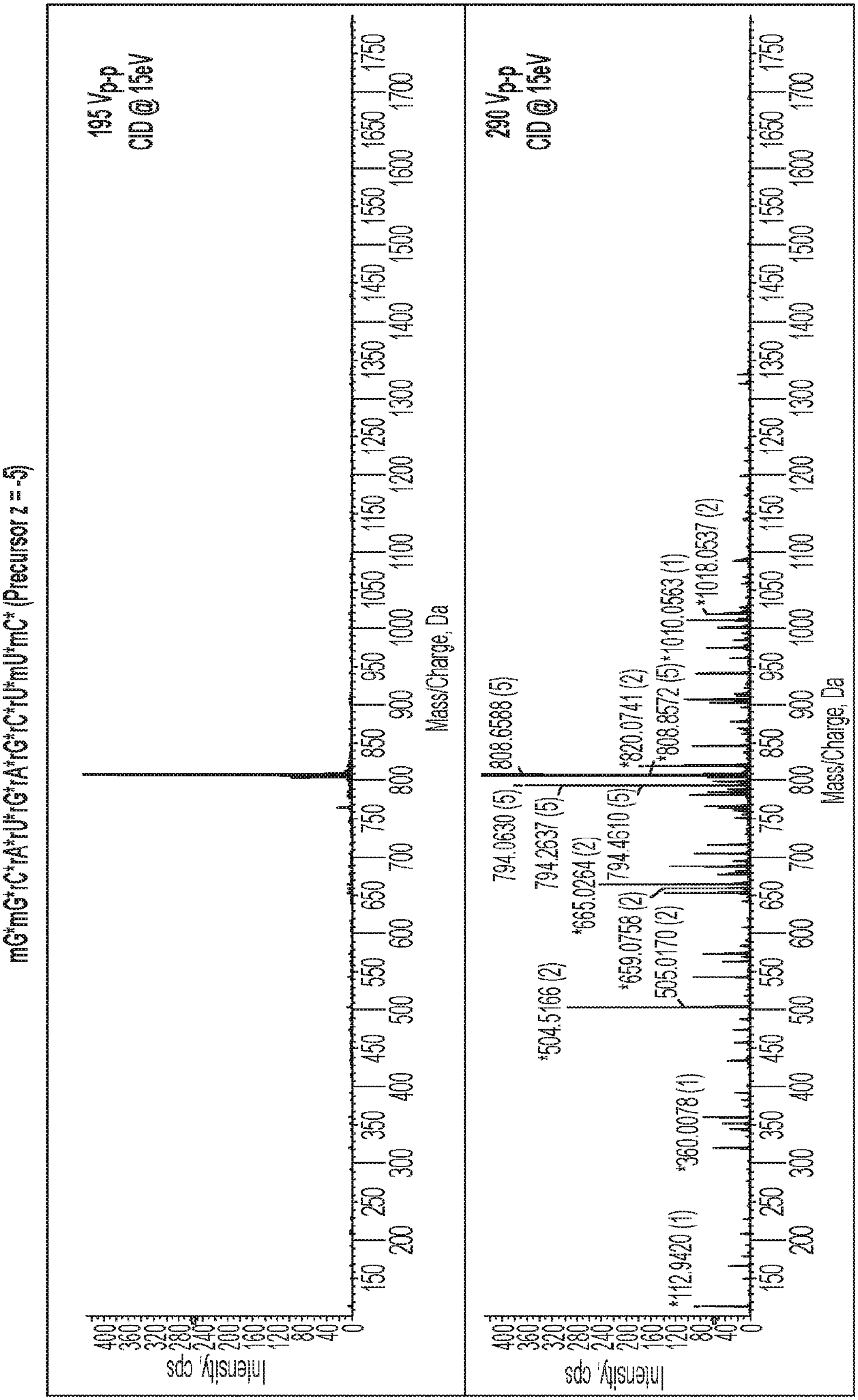
FIG. 6 depicts example mass spectrum in MS/MS mode of a multiply-charged anions transmitted through a conventional high-pressure ion guide and a high-pressure ion guide operated in accordance with an aspect of various embodiments of the applicant's teachings.

Conversely, it will be appreciated in light of the present teachings and as exemplified in FIGS. 5A-C, that increasing the amplitude of the RF voltage applied to the front end ion guide may be effective to increase the likelihood of the formation of charge-reduced ions. While electron detachment may be disfavored in MS as it can cause aberrations in the isotopic distribution, for example, the applicants have found that the formation of radical charged-reduced species may nonetheless benefit MS/MS analysis. By way of non-limiting example, the present teachings provide that radical ions formed in the high pressure region may require reduced energy to dissociate within a downstream collision cell and/or may cause fragmentation to occur at more or different sites within the radical ions. With reference now to FIG. 6, two mass spectrum are depicted. The upper panel represents the spectrum generated by ionizing the oligonucleotide sequence (mG*mG*rC*rA*rU*rG*rA*rG*rC*rU*mU*mC*), transmitting the ions through a front end ion guide operating with a 195 $V_{p-p}$, and subjecting the −5 precursor selected in Q1 (~807 m/z) to collision induced dissociation at 15 eV in q2. The same process is performed to generate the spectrum of the lower panel except that the amplitude of the RF voltage applied to the front end ion guide is increased to 290 $V_{p-p}$. Comparing the upper and lower panels, a person skilled in the art would appreciate that significantly more fragment ions were produced when operating the ion guide at the increased RF amplitude. Indeed, substantially no fragments are shown in the upper panel.

Figure 7:
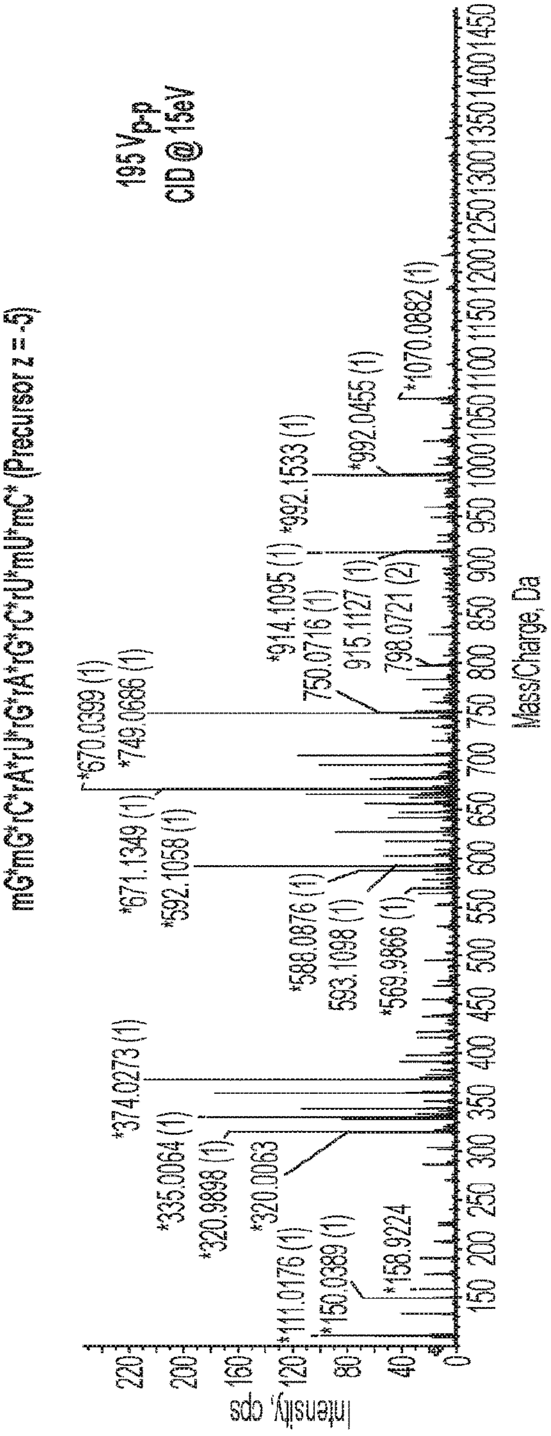
FIG. 7 depicts example mass spectrum in MS/MS mode of a multiply-charged anions transmitted through a conventional high-pressure ion guide and a high-pressure ion guide operated in accordance with an aspect of various embodiments of the applicant's teachings.
Figure 7:
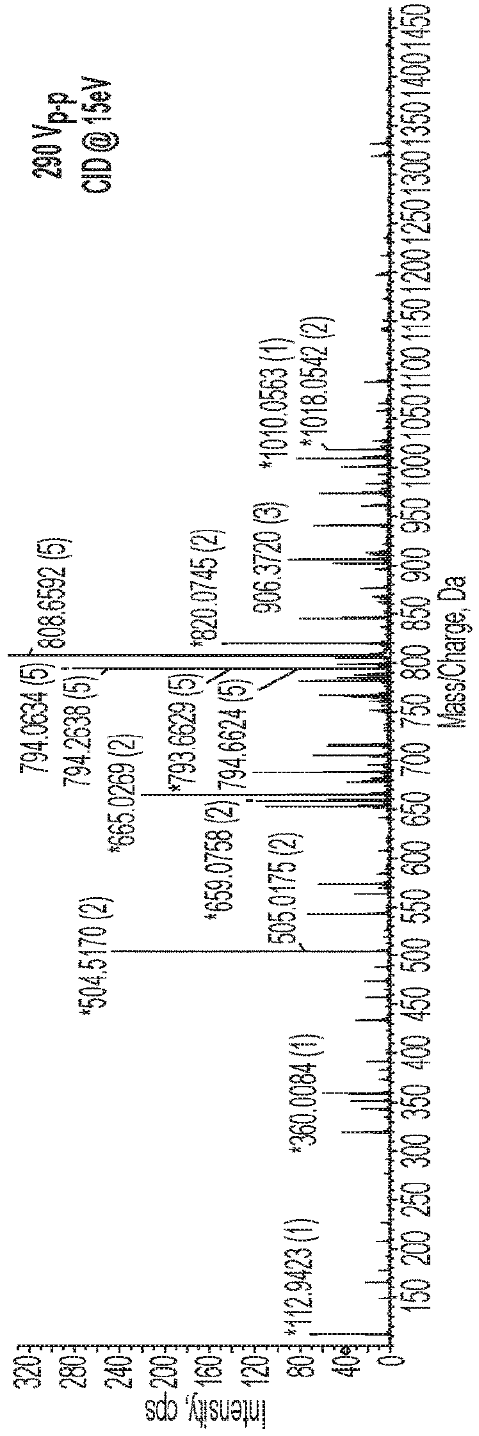

FIG. 7 also depicts two spectrum generated from the same oligonucleotide sequence substantially as discussed above with reference to FIG. 6. The top panel of FIG. 7 differs from that of FIG. 6, however, in that the dissociation energy was increased to 25 eV, which was sufficient to generate fragment ions from the −5 charge state ions that were transmitted through a front end ion guide having an RF amplitude of 195 $V_{p-p}$ applied thereto. Not only was less energy applied (i.e., 15 eV) to achieve fragmentation of the −5 charge state ions that were subjected to an increased RF amplitude in the front end ion guide (i.e., 290 $V_{p-p}$) as shown in the lower panel of FIG. 7, a greater number of multiply-charged fragments were produced from the ions subjected to an increased RF amplitude relative to those of the top panel of FIG. 7. Since MS/MS was performed on a multiply charged ion, fragment ions generated will have charge ranging from −1 up to the charge state of the precursor ion (−5 in this example data). When the CID is performed with RF at low value (195 $V_{p-p}$) as in the top panel of FIG. 7, the majority of the fragment ions will be singly charged and the spectrum will have none of the higher charge states. However, when the MS/MS is performed with the RF set to 290 $V_{p-p}$, a large number of fragment ions will carry charges as high as the precursor ion selected (−5 in this example data).

Figure 8A:
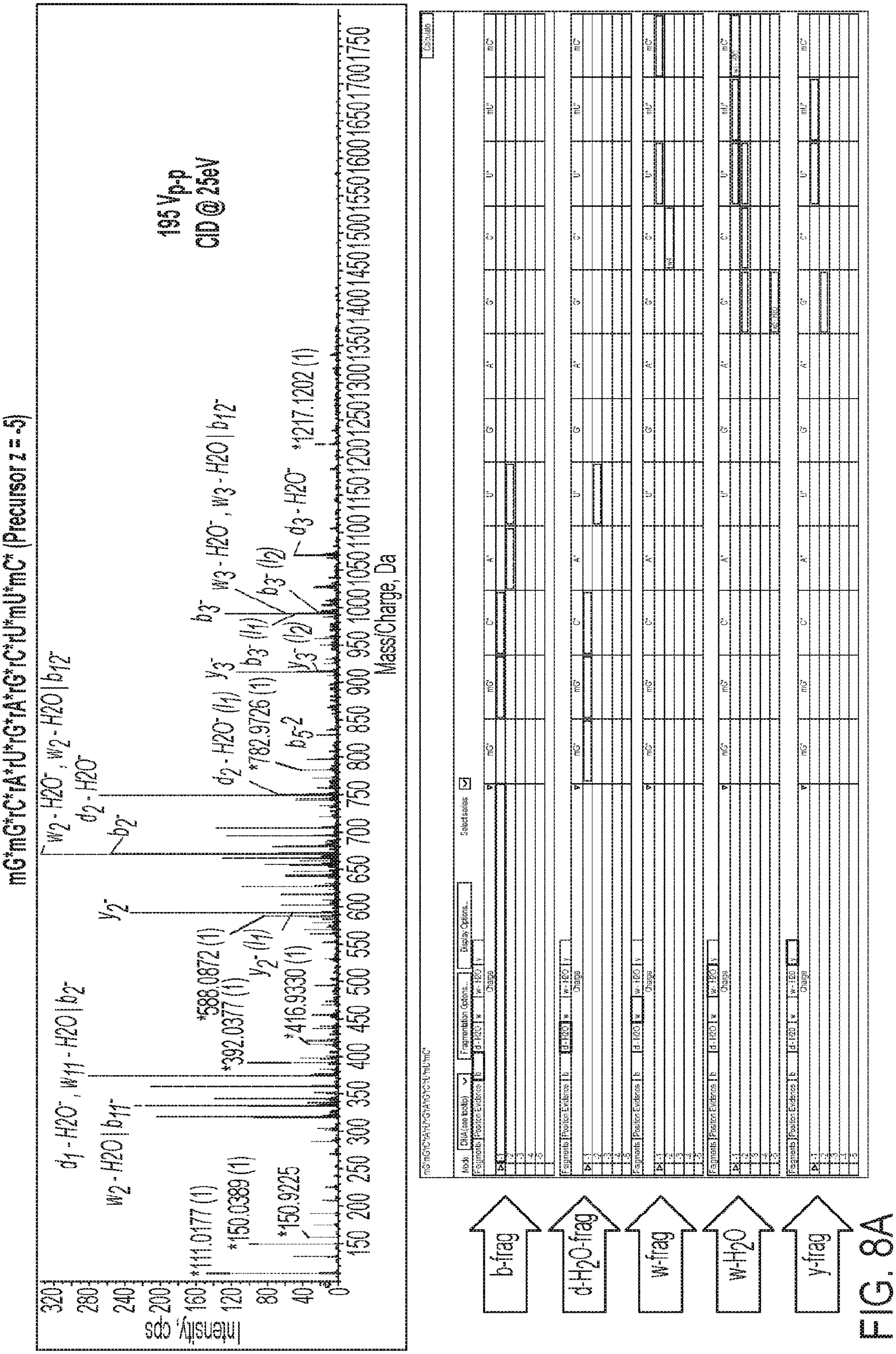
FIG. 8A-B depict example fragmentation of FIG. 7 in additional detail.
Figure 8B:
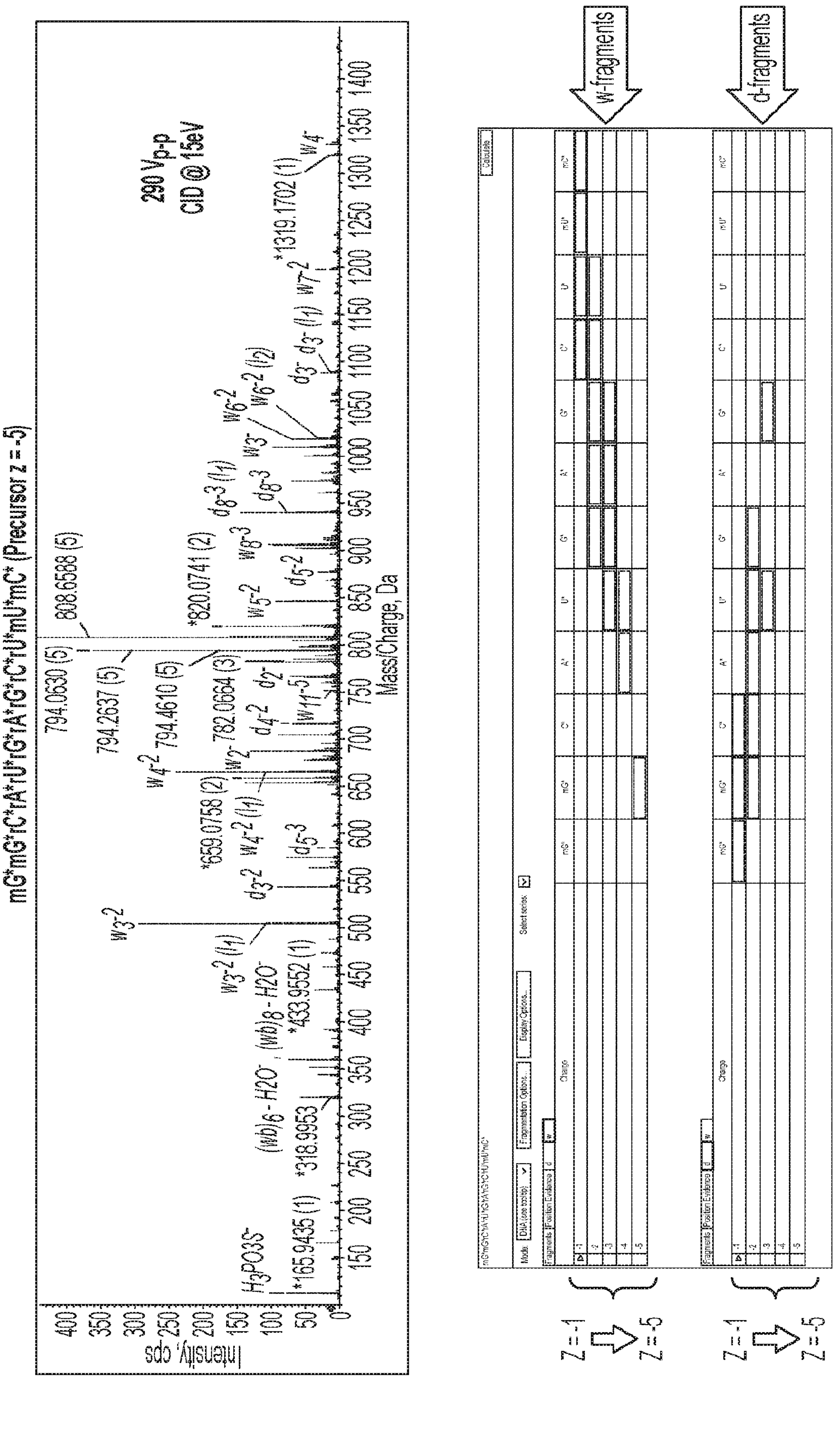

As shown in FIG. 8A (corresponding to the top panel of FIG. 7) and FIG. 8B (corresponding to the bottom panel), further analysis of these fragments demonstrate that the −5 charge state ions also subject to charge reduction provided more complete sequence information. When CID is performed on the −5 charge state ions with RF set to 195 $V_{p-p}$ as in the top panel of FIG. 7 and FIG. 8A, the majority of the fragment ions generated are singly-charged and provide limited sequence confirmation, predominantly from b-, w- and y-fragment ions (including water losses). However, for CID spectra of the −5 charge state ions generated with RF at 290 $V_{p-p}$ as in the bottom panel of FIG. 7 and FIG. 8B, higher sequence coverage is obtained with the formation of w-ions and their complimentary d-ions, both detected at several charge states, thus increasing the confidence.

In light of the above, it will be appreciated that the system 100 of FIG. 1 can alternatively operate in two, distinct modes of operation to control the likelihood of charge reduction of ions of a given mass being transmitted through the front end high pressure ion guide 106 depending, for example, on the analysis of the ions to be performed by the downstream mass analyzers 110, 114. By way of example, in a first mode of operation, the controller 193 can configure (e.g., automatically or under the direction of a user) the power supply 195 to provide an RF voltage signal to the plurality of rods 106*a-d* so as to reduce the likelihood of electron detachment from the ions, thereby more accurately retaining the isotopic distribution of ions generated by the ion source 104 and enabling a more accurate determination of the relative quantity and masses of particular isotopes (e.g., as in MS). Alternatively, in a second mode of operation, the controller 193 can configure the power supply 195 to provide a different RF voltage signal to rods 106*a-d* that is higher than the RF voltage signal in the first mode of operation, thereby increasing the likelihood of electron detachment from the ions, which when performing MS/MS may improve fragmentation of the charge-reduced ions as discussed above with reference to FIGS. 6-8. In accordance with various aspects of the present teachings, the amplitude of the RF signal applied to the ion guide 106 in the first mode of operation can be less than about 200 $V_{p-p}$ and greater than about 250 $V_{p-p}$ in the second mode of operation. In certain aspects, a maximum of the RF voltage signal in the first mode of operation may be 210 $V_{p-p}$ and a maximum of the RF voltage signal in the second mode of operation may be about 300 $V_{p-p}$.

In accordance with various aspects of the present teachings, it will also be appreciated that the example ion guides described herein can be disposed in a variety of front-end locations of mass spectrometer systems. For example, though the ion guide 106 as particularly described with respect to FIGS. 3-4 is depicted as being the first ion guide downstream of the ionization chamber 14, it will be appreciated that the present teachings can be applied to a variety of known or hereafter developed ion guides that are maintained at an intermediate pressure between the ionization chamber and the high-vacuum chamber within which the mass analyzer(s) are disposed. By way of non-limiting example, the ion guide can serve in the conventional role of a QJet® ion guide, as one set of rods of a double QJet or as an intermediate device between a QJet® ion guide and Q0 (e.g., operated at a pressure in the 100 s of mTorrs, at a pressure between a typical QJet® ion guide and a typical Q0 focusing ion guide).

Figure 9:
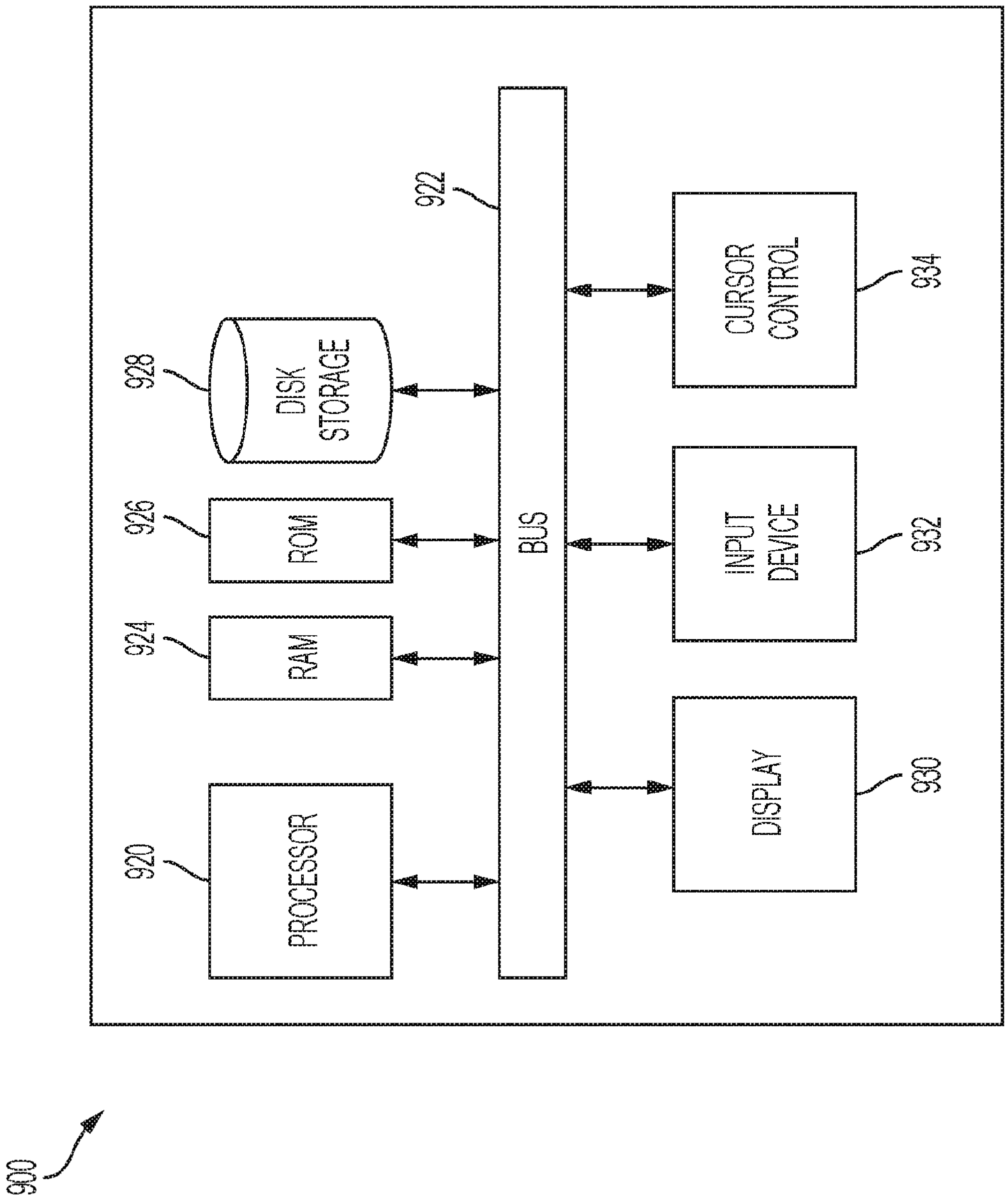
FIG. 9 is a block diagram that illustrates a computer system, upon which embodiments of the present teachings may be implemented in accordance with various aspects of the applicant's teachings.

FIG. 9 is a block diagram that illustrates a computer system 900, upon which embodiments of the present teachings may be implemented. Computer system 900 includes a bus 922 or other communication mechanism for communicating information, and a processor 920 coupled with bus 922 for processing information. Computer system 900 also includes a memory 924, which can be a random access memory (RAM) or other dynamic storage device, coupled to bus 922 for storing instructions to be executed by processor 920. Memory 924 also may be used for storing temporary variables or other intermediate information during execution of instructions to be executed by processor 920. Computer system 900 further includes a read only memory (ROM) 926 or other static storage device coupled to bus 922 for storing static information and instructions for processor 920. A storage device 928, such as a magnetic disk or optical disk, is provided and coupled to bus 9 for storing information and instructions.

Computer system 900 may be coupled via bus 922 to a display 930, such as a cathode ray tube (CRT) or liquid crystal display (LCD), for displaying information to a computer user. An input device 932, including alphanumeric and other keys, is coupled to bus 922 for communicating information and command selections to processor 920. Another type of user input device is cursor control 934, such as a mouse, a trackball or cursor direction keys for communicating direction information and command selections to processor 920 and for controlling cursor movement on display 930. This input device typically has two degrees of freedom in two axes, a first axis (i.e., x) and a second axis (i.e., y), that allows the device to specify positions in a plane.

A computer system 900 can perform the present teachings. Consistent with certain implementations of the present teachings, results are provided by computer system 900 in response to processor 920 executing one or more sequences of one or more instructions contained in memory 924. Such instructions may be read into memory 924 from another computer-readable medium, such as storage device 928. Execution of the sequences of instructions contained in memory 924 causes processor 920 to perform the process described herein. Alternatively, hard-wired circuitry may be used in place of or in combination with software instructions to implement the present teachings. Thus, implementations of the present teachings are not limited to any specific combination of hardware circuitry and software. For example, the present teachings may be performed by a system that includes one or more distinct software modules for performing a method of operating a front end ion guide at operating pressures greater than about 100 mTorr in accordance with various embodiments.

In various embodiments, computer system 900 can be connected to one or more other computer systems, like computer system 900, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The term "computer-readable medium" as used herein refers to any media that participates in providing instructions to processor 920 for execution. Such a medium may take many forms, including but not limited to, non-volatile media, volatile media, and transmission media. Non-volatile media includes, for example, optical or magnetic disks, such as storage device 928. Volatile media includes dynamic memory, such as memory 924. Transmission media includes coaxial cables, copper wire, and fiber optics, including the wires that comprise bus 922.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 920 for execution. For example, the instructions may initially be carried on the magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector coupled to bus 922 can receive the data carried in the infra-red signal and place the data on bus 922. Bus 922 carries the data to memory 924, from which processor 920 retrieves and executes the instructions. The instructions received by memory 924 may optionally be stored on storage device 928 either before or after execution by processor 920.

The descriptions herein of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software, though the present teachings may be implemented as a combination of hardware and software or in hardware alone. The present teachings may be implemented with both object-oriented and non-object-oriented programming systems.

The section headings used herein are for organizational purposes only and are not to be construed as limiting. While the applicant's teachings are described in conjunction with various embodiments, it is not intended that the applicant's teachings be limited to such embodiments. On the contrary, the applicant's teachings encompass various alternatives, modifications, and equivalents, as will be appreciated by those of skill in the art.

What is claimed is:

1. A mass spectrometer system, comprising:

a first vacuum chamber maintained at a pressure above about 500 mTorr, the first vacuum chamber extending between an inlet aperture, configured to receive a plurality of ions generated by an ion source in a high pressure ionization chamber, and an exit aperture configured to transmit at least a portion of said plurality of ions from the first vacuum chamber to a second vacuum chamber maintained at a lower pressure relative to the first vacuum chamber;

at least one ion guide disposed within the first vacuum chamber between the inlet aperture and the exit aperture, the at least one ion guide comprising a plurality of rods extending along a central longitudinal axis from a proximal end disposed adjacent the inlet aperture to a distal end, the plurality of rods being spaced apart from the central longitudinal axis and configured to define an internal volume within which the plurality of ions received through the inlet aperture are entrained by a flow of gas;

a power supply coupled to the ion guide, the power supply being configured to provide a RF voltage signal to the plurality of rods for radially confining the ions within the internal volume; and a controller, operatively coupled to the power supply, configured to:

adjust an amplitude of the RF voltage signal provided to the plurality of rods so as to alternatively operate the ion guide in a first mode of operation in which an isotopic distribution of said plurality of ions is substantially maintained during transmission through said ion guide and a second mode of operation in which the plurality of ions being transmitted therethrough are more likely subject to electron detachment, wherein the amplitude of the RF voltage signal in the first mode of operation is less than the amplitude of the RF voltage signal in the second mode of operation.

2. The system of claim 1, wherein the ion source is operating in negative ion mode.

3. The system of claim 1, wherein the plurality of ions comprise oligonucleotides.

4. The system of claim 1, wherein a maximum of the RF voltage signal in the first mode of operation is 210 Vp-p.

5. The system of claim 1, wherein a maximum of the RF voltage signal in the second mode of operation is about 300 Vp-p.

6. The system of claim 1, wherein the RF voltage signal in the first mode of operation is less than or equal to about 200 Vp-p, and wherein the RF voltage signal in the second mode of operation is greater than or about 250 Vp-p.

7. The system of claim 1, wherein said plurality of ions comprise anions.

8. The system of claim 1, wherein said plurality of ions are transmitted from said ion guide to one or more downstream mass analyzers and a detector configured to detect a m/z of at least a portion of said plurality of ions, and wherein, in the first mode of operation, the m/z of said at least a portion of said plurality of ions is detected substantially without fragmenting said plurality of ions transmitted from said ion guide.

9. The system of claim 1, wherein said plurality of ions are transmitted from said ion guide to one or more downstream mass analyzers and a detector configured to detect a m/z of at least a portion of said plurality of ions, and wherein, in the second mode of operation, said one or more downstream mass analyzers are configured to generate one or more product ions from said plurality of ions for detection by the detector.

10. The system of claim 9, wherein said one or more downstream mass analyzers comprises a collision cell, and wherein the second mode of operation is effective to reduce collision energy of a collision induced dissociation of said plurality of ions within said collision cell.

11. The system of claim 1, wherein a likelihood of electron detachment from said plurality of ions during transmission through said ion guide in the first mode of operation is less than a likelihood of electron detachment from said plurality of ions during transmission through said ion guide in the second mode of operation.

12. The system of claim 1, wherein a likelihood of fragmentation of said plurality of ions during transmission through said ion guide in the second mode of operation is greater than a likelihood of fragmentation of said plurality of ions during transmission through said ion guide in the first mode of operation.

13. The system of claim 1, wherein a population of free radical species is generated from said plurality of ions during transmission through said ion guide in the second mode of operation.

14. The system of claim 1, wherein the pressure within the first vacuum chamber is in a range of about 1 to 10 Torr, or wherein the pressure within the second vacuum chamber is in a range of about 3 mTorr to about 15 mTorr.

15. The system of claim 1, wherein the pressure within the ionization chamber is about 760 Torr.

16. A method of operating a mass spectrometer, comprising:

receiving a plurality of ions generated by an ion source through an inlet of a first vacuum chamber maintained at a pressure above about 500 mTorr;

transmitting said plurality of ions through an ion guide disposed in the first vacuum chamber, wherein the ion guide comprises a plurality of rods extending along a central longitudinal axis from a proximal end disposed adjacent the inlet to a distal end, the plurality of rods being spaced apart from the central longitudinal axis and configured to define an internal volume within which the plurality of ions received through the inlet are entrained by a flow of gas;

adjusting an amplitude of a RF voltage signal provided to the plurality of rods so as to alternatively operate the ion guide in a first mode of operation in which an isotopic distribution of said plurality of ions is substantially maintained during transmission through said ion guide and a second mode of operation in which the plurality of ions being transmitted therethrough are more likely subject to electron detachment, wherein the amplitude of the RF voltage signal in the first mode of operation is less than the amplitude of the RF voltage signal in the second mode of operation; and transmitting at least a portion of said plurality of ions through an exit of the first vacuum chamber to a second vacuum chamber maintained at a lower pressure relative to the first vacuum chamber.

17. The method of claim 16, further comprising generating said plurality of ions at about atmospheric pressure.

18. The method of claim 16, wherein the RF voltage signal in the first mode of operation is equal to or less than about 200 Vp-p and wherein the RF voltage signal in the second mode of operation is equal to or greater than about 250 Vp-p.

19. The method of claim 16, wherein in the first mode of operation, a m/z of at least a portion of said plurality of ions transmitted through the ion guide is detected substantially without fragmenting said plurality of ions after transmission from said ion guide.

20. The method of claim 16, wherein in the second mode of operation, one or more downstream mass analyzers are configured to generate one or more product ions from said plurality of ions.

* * * * *